(12) United States Patent
McGreer et al.

(10) Patent No.: US 10,345,629 B2
(45) Date of Patent: Jul. 9, 2019

(54) PLANAR OPTICAL PHASE SHIFTERS WITH EFFICIENT HEATER PLACEMENT

(71) Applicant: NeoPhotonics Corporation, San Jose, CA (US)

(72) Inventors: Kenneth McGreer, Livermore, CA (US); Calvin Ho, San Jose, CA (US)

(73) Assignee: NeoPhotonics Corporation, San Jose, CA (US)

( * ) Notice: Subject to any disclaimer, the term of this patent is extended or adjusted under 35 U.S.C. 154(b) by 0 days.

(21) Appl. No.: 15/846,755

(22) Filed: Dec. 19, 2017

(65) Prior Publication Data

US 2018/0173025 A1   Jun. 21, 2018

Related U.S. Application Data

(60) Provisional application No. 62/437,110, filed on Dec. 21, 2016.

(51) Int. Cl.
*G02F 1/01* (2006.01)
*G02F 1/225* (2006.01)
*G02F 1/21* (2006.01)

(52) U.S. Cl.
CPC .......... *G02F 1/0147* (2013.01); *G02F 1/225* (2013.01); *G02F 1/2257* (2013.01); *G02F 2001/212* (2013.01); *G02F 2201/06* (2013.01); *G02F 2202/09* (2013.01); *G02F 2203/48* (2013.01); *G02F 2203/50* (2013.01)

(58) Field of Classification Search
CPC ...... G02F 1/0147; G02F 1/2257; G02F 1/225; G02F 2203/50; G02F 2203/48; G02F 2201/06; G02F 2001/212; G02F 2202/09
See application file for complete search history.

(56) References Cited

U.S. PATENT DOCUMENTS

| | | |
|---|---|---|
| 5,165,001 A | 11/1992 | Takagi et al. |
| 6,615,615 B2 | 9/2003 | Zhong et al. |
| 6,658,174 B2 | 12/2003 | Doerr |
| 6,760,499 B2 | 7/2004 | Pezeshki et al. |
| 6,766,083 B2 | 7/2004 | Bona et al. |
| 6,980,707 B2 | 12/2005 | Chiba et al. |
| 7,160,746 B2 | 1/2007 | Zhong et al. |
| 7,162,120 B2 | 1/2007 | Yamazaki |
| 7,389,033 B2 | 6/2008 | Hashizume et al. |
| 7,447,393 B2 | 11/2008 | Yan et al. |
| 7,627,203 B2 * | 12/2009 | Chen ............... G02F 1/0147 385/129 |
| 7,676,121 B2 | 3/2010 | Gill et al. |
| 7,720,328 B2 | 5/2010 | Yan et al. |
| 7,961,991 B2 | 6/2011 | Hasegawa et al. |

(Continued)

*Primary Examiner* — Ryan A Lepisto
(74) *Attorney, Agent, or Firm* — Christensen, Fonder, Dardi & Herbert PLLC; Peter S. Dardi

(57) ABSTRACT

Energy efficient thermo-optic phase shifters have a configuration with two sections of a waveguide adjacent for heating by a common heater. A loop section can connect the two heated waveguide sections. Further improved efficiency can be achieved in which the heated sections are curved to allow closer placement of the adjacent waveguides. The heater can be curved to follow the configuration of the curved heated waveguide sections. Energy efficiency gains can be up to approximately a factor of two over corresponding traditional thermo-optical phase shifter designs.

22 Claims, 26 Drawing Sheets

(56) References Cited

U.S. PATENT DOCUMENTS

| | | |
|---|---|---|
| 8,103,136 B2 | 1/2012 | Chen et al. |
| 2003/0039461 A1 | 2/2003 | How Kee Chun et al. |
| 2008/0159681 A1 | 6/2008 | Gill et al. |
| 2012/0062900 A1 | 3/2012 | Langley et al. |
| 2012/0195544 A1 | 8/2012 | Shen et al. |
| 2014/0375999 A1 | 12/2014 | Okamoto |
| 2016/0127070 A1* | 5/2016 | Nagarajan ............... G02F 1/025 398/82 |
| 2016/0266320 A1 | 9/2016 | Li et al. |
| 2016/0363835 A1 | 12/2016 | Nagarajan |

\* cited by examiner

PLANAR OPTICAL PHASE SHIFTERS WITH EFFICIENT HEATER PLACEMENT

CROSS REFERENCE TO RELATED APPLICATIONS

This application claims priority to U.S. provisional patent application 62/437,110 filed Dec. 21, 2016 to McGreer et al., entitled "Compact Phase Shifters and Corresponding Mach-Zehnder Interferometers," incorporated herein by reference.

FIELD OF THE INVENTION

The invention relates to thermo-optic phase shifters in a planar lightwave circuit that can, in particular, good thermal efficiency and compact formats, which can find application in optical telecommunication systems.

BACKGROUND OF THE INVENTION

Optical components providing a given function for fiber optical communications are progressing towards smaller size with less electrical power consumption. Integrated optical technology such as planar lightwave circuits is a key enabler of this progress. The planar lightwave circuit (PLC) generally is formed on a flat substrate. Materials can be patterned to form optical waveguides that will constrain light of an appropriate wavelength range so that the light may be guided along optical pathways defined by a core material of the waveguide. Types of optical waveguides includes, but is not limited to, ridge waveguides, rib waveguides, and channel waveguides. As one example, a channel waveguide with a rectangular cross section may comprise a silica core region surrounded by a silica cladding region wherein the index of refraction of the core region is higher in value than that of the silica cladding region. In such an example, the percentage difference between to two values of index of refraction may be referred to as the index contrast. This particular example may be used to exemplify particular design considerations which may be modified to suit a particular situation by one practiced in the art. However, as known in the art, many other waveguide variations are possible and many other materials suitable for forming optical waveguides (including silicon, InP, various polymers, and various other glass materials) are possible.

Many useful functions within a PLC are provided by static devices; conversely, some functions require dynamic control from circuitry external to the PLC. A thermo-optic phase shifter is a common device that enables dynamic control of various optical functions. Typically, a thermo-optic phase shifter is formed by depositing a thin film of metal onto the top cladding above the optical waveguide. The metal film or semiconductor film can be patterned to define the boundaries of the heater, and herein is referred to as the "heater." Desirable metal materials for heaters resist corrosion and are generally durable, such as tungsten, nickel-chromium alloys (nichrome), and other metals, such as those known in the art. Methods for forming heaters for PLCs include deposition by sputtering, other physical vapor deposition, or other suitably process followed by patterning.

One of the commercially significant devices integrated onto a PLC is a Mach-Zehnder interferometer (MZI). Providing an MZI with an optical phase shifter on one or both of the arms of an MZI can provide dynamic control over some aspects of the MZI function. A number of optical phase shifters are known in the art, including, but not limited to, thermo-optic phase shifters, carrier injection phase shifters, and carrier depletion phase shifters. The transfer function of the MZI is dependent upon the phase shift of the first arm relative to the phase shift of the second arm. In particular, the transfer function of the MZI depends on the differential phase shift and is substantially independent on the amount of phase shift that is common to both arms. When the MZI is configured with at least one thermo-optic phase shifter, the function of the phase shifter is to introduce a temperature difference between the first arm and the second arm and thereby determine the MZI transfer function. An MZI with a phase shifter on one or both arms may be used as an optical switch or, alternatively, as a variable optical attenuator (VOA).

SUMMARY OF THE INVENTION

In a first aspect, the invention pertains to a planar thermo-optic phase shifter comprising a heater and a waveguide on a planar substrate surface establishing the plane of the device. Generally, the waveguide comprises two adjacent heated segments having outer edges furthest away from the adjacent heated segment and a loop section connecting the two adjacent heated segments, and the heater is positioned over cladding optical material. In some embodiments, a projection of the heater into the plane of the waveguides forms a shape that is located between the adjacent heated segments and extends no further than the outer edges of the adjacent heated segments.

In a further aspect, the invention pertains to a planar thermo-optic phase shifter comprising a heater and a waveguide on a planar substrate surface establishing the plane of the device, in which the waveguide can comprise two adjacent heated core sections connected by a waveguide core loop such that the optical path is opposite in the adjacent heated core sections. Considering a reference plane passing through the center of the waveguides and parallel to the plane of the device, a majority of the heated core sections are curved and a projection of the heater in the reference plane is curved along its length.

In other aspects, the invention further pertains to a method for making an energy efficient thermo-optic phase shifter within a planar lightwave circuit, the method comprising the step of depositing metal for a resistive heating element onto a planar optical structure comprising an optical waveguide having two adjacent heated sections separated from each other by an average spacing and optically connected to each other by a loop section of the waveguide. A projection of the metal for the restive heating element in the plane of the waveguides can be located at least in part between the adjacent heated sections and optionally extending over one or both heated sections with the projection of the metal in the plane of the waveguides extending no further than outer edges of the adjacent heated section of the waveguide in which the outer edges of the heated sections are evaluated along a width that is perpendicular to a light propagation direction through the heated sections.

In additional aspects, the invention pertains to a thermal optic phase shifter comprising a silica glass waveguide core within silica glass cladding, a heater configured to heat a portion of the silica glass waveguide core, in which the heat from the heater can provide a phase shift of at least 0.75 degrees per milliwatt heater power.

DETAILED DESCRIPTION OF THE INVENTION

Figure 1:
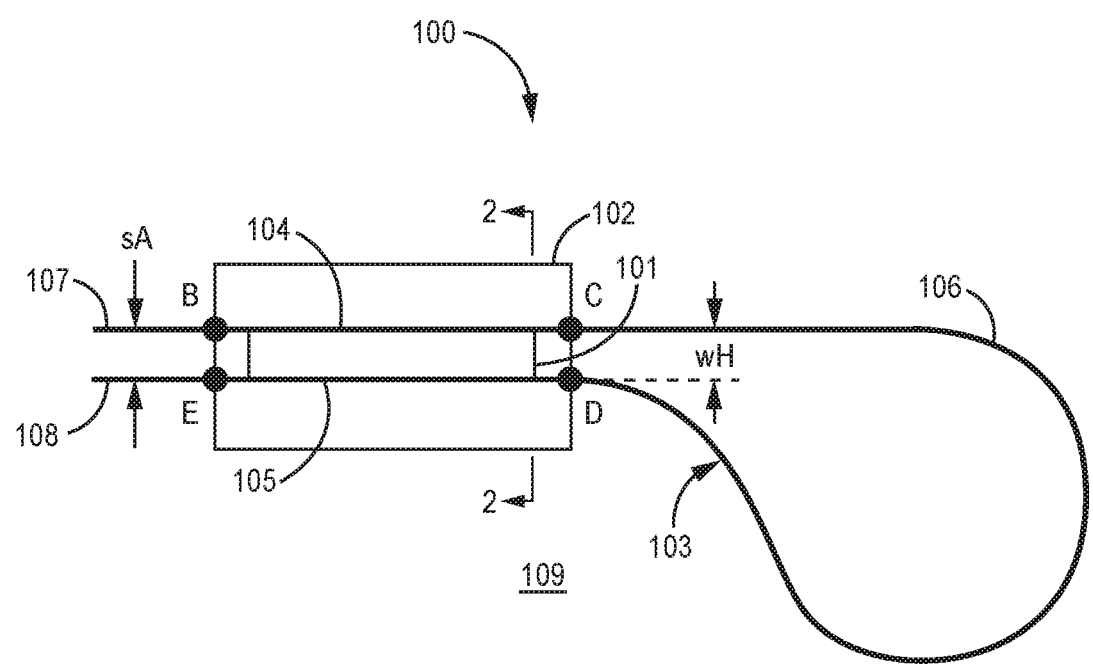
FIG. 1 is a schematic top view of an embodiment of a thermo-optic phase shifter with two adjacent straight segments of waveguide within a thermal zone of a heater.

Planar optical waveguide structures are described with thermo-optical phase shifters to modify the optical transmission in which the waveguide has a looped structure to bring two sections with opposite light propagation direction in thermal contact with a common heater that can have one or more heating elements to improve heating efficiency while providing for relatively compact arrangement on the planar structure. In some designs, desirable device layouts with a compact format can be achieved through heating curved sections of the waveguides with appropriately close placement of adjacent waveguides commonly heated by the heater. The heater generates a thermal zone in which a temperature increase provides a significant phase shift of light through a waveguide. Width of the heater proximate to the adjacent waveguides can be adjusted to correspondingly adjust the thermal zone to provide a desired amount of heating of the waveguides and an appropriate thermal gradient to provide efficient energy use. The thermo-optic phase shifter can be integrated into a planar optical circuit. The energy efficient designs are also compatible with designs of Mach-Zehnder interferometers incorporating the phase shifters in a compact, but energy efficient designs as well as the designs of other PLC optical integrated circuits.

Thermo-optical elements can introduce desired functionality into optical devices, especially optical devices providing functionality for optical telecommunication. A basic component resulting from a thermo-optical element can be a phase shifter in which heating of a planar optical waveguide results in the phase shift relative to transmission without heating the waveguide. The energy expenditure of the thermo-optic phase shifter can be a significant consideration in the operation of the device, and corresponding energy efficient designs can provide significant advantages for optical device use. The designs herein can provide significant energy savings in the operation of the thermo-optical phase shifter.

The devices described herein are formed in a format of a planar optical structure with light traveling primarily through waveguide cores that are surrounded by cladding optical material. In the context of integration of planar optical devices into an optical telecommunication system the planar optical structures can be referred to as planar lightwave circuits (PLCs) that can comprise one or a plurality of optical devices that may be integrated within an optical chip generally having optical connections along its edges for connection to optical fibers and/or other PLC. For convenience, the term "waveguide" is used herein interchangeably with the "core" structure even though the electric field propagating through the waveguide is not completely isolated within the core. The core does identify the path of light propagation while cladding optical material generally extends a significant distance from the localized position of the propagating light concentrated in the core optical material.

For the description of aspects of the structure, it can be helpful to consider the location of elements within a plane, while keeping in mind that the structure has a thickness and some elements can be in different layers of the structure. For this purpose, the plane of the device (or equivalently, the plane of the structure) is defined as the plane that runs through the waveguide center points where the waveguide center points are the points at the center of any cross section view of the waveguide perpendicular to the light propagation direction. References to locations of three dimensional features on various layers, should be understood to be references to the projections of these features onto the plane of the device. For example, stating that a heater is between two waveguides is understood to mean that the projection of the heater onto the lane of the device is between the projections of the waveguides onto the plane of the device. In the energy efficient phase shifter designs described herein, the projection of the heater into the plane of the waveguides can be curved analogous to the waveguides along the general direction of light propagation.

As noted above, the heater for a thermo-optical phase shifter can comprise a metal or semiconductor film over the cladding surrounding an underlying waveguide core. Typically, electrical contact pads are formed at appropriate locations so that an external circuit may provide a voltage difference across the contact pads thereby causing current to flow though heater that generates heat from electrical resistance. The material and geometry of the contact pad may be configured so that it is suitable for using wire bonding as a technique for providing electrical contact to external circuitry. Generally, a passivation layer can be deposited over the patterned metal film to protect the patterned metal film from corrosion while it remains at an elevated temperature during the course of its heating function. As current flows through the heater, electrical power is dissipated and converted to heat which increases the temperature of the material in the vicinity of the heater, including the optical waveguide embedded in cladding near the heater. By elevating the temperature of the material that forms the optical waveguide, the index of refraction of the material is changed, which results in a phase delay associated with the optical propagation through the waveguide; hence the light emerging form the exit of the heated waveguide is shifted in phase relative to the phase of the light emerging from a similar unheated waveguide. In this context, efficiency can be evaluated as the phase shift achieved relative to the electrical power delivered to the heater. If a desired phase shift is targeted, the ability to achieve the target phase shift with less electrical power expenditure results in a desirable energy saving that translates into a direct cost savings as well as a potential reduction in resources directed to thermal management of an optical telecommunications network facility.

The fundamental aspects of the improved phase shifters are that effective use of heat with less waste, e.g., conducted heat that is not delivered to the heated waveguides, can be obtained by simultaneously heating two adjacent segments of waveguide simultaneously so that conduction of the heat through the structure can be more effectively captured. For this heating process to function efficiently, the waveguides should be placed relatively close to each other on the scale of thermal conduction through the structure. The close placement of the waveguides can be limited by optical crosstalk between the adjacent waveguides if they are placed too close together. Optical crosstalk can result in noise within an optical telecommunication signal transmitted through the waveguides. The spacing of the waveguides while achieving crosstalk within acceptable ranges depends on the optical properties of the materials, but for realistic materials, the spacing can be small enough to allow for thermal efficiencies of the present designs. If the heated segments are curved, the adjacent waveguides can be placed closer within crosstalk limits. Therefore, in some embodiments, it is desirable to heat curved adjacent segments of waveguides. For the purposed herein for any waveguide segment at an arbitrary location with a length along the light path of 10 microns or more, a linear trajectory can be associated with any waveguide segment with a radius of curvature of at least 10 millimeters, and any segment with a radius of curvature less than 10 millimeters is considered curved.

The particular positioning of the loopback waveguide connecting the two commonly heated waveguide sections generally is not particularly significant. When combined with curved commonly heated waveguide section, the can be positioned to provide an open area between the loopback waveguide and the curved commonly heated waveguide sections. This open area can be used for the placement of unheated waveguides of other planar optical components. As noted further below, this space can be particularly effectively use for the placement of a second thermo-optic phase shifter, such as for the formation of a Mach-Zehnder interferometer.

To place segments of a waveguide arm adjacent to each other, the waveguide can loop to bring the segments together. The radius of curvature of the loop cannot be too small without resulting in an undesirable amount of optical loss from transmission of the optical signal over the loop. The radius of curvature suitable within optical loss tolerances is a function of the index of refraction difference between the core optical material of the waveguide and the cladding optical material surrounding the core. To achieve a more compact structure, it can be desirable to make the radius of curvatures smaller within the limits of obtaining acceptable optical losses. In general, the diameter, i.e., twice the radius of curvature, of the loop is significantly greater than the acceptable spacing between adjacent waveguides so that in the context of present designs, significant heating of the loop does not provide a desirable energy efficiency since conducted heat cannot be effectively captured by heated waveguides.

With a particular placement of a heater, a corresponding thermal zone (or, equivalently, heated zone) can be expected within which the waveguide is significantly heated. The thermal zone extends beyond the heater position due to thermal conduction. References to points and features relative to the thermal zone, generally are understood to refer to the location in the plane of the device unless explicitly indicated otherwise since the heating of the waveguides is of particular significance rather than the heating generally. The hot point refers to a point or region on the plane of the device with the highest temperature within measurement error. The heat dissipates gradually, but the boundary of the thermal zone can be specified for convenience where the temperature increase from ambient is a factor of two less than the temperature increase over ambient due to the heater at the hot point. In embodiments of particular interest, the thermal zone extends across the width of the waveguides whether or not the heater element extends across the width of the waveguides. But the thermal zone generally does not extend too far past the edges of the waveguides to reduce the wasted thermal energy. Due to the thermal conduction, heating between the adjacent waveguides tends to provide heat to both waveguides, so placement of the heater completely or with significant portions between the waveguides can provide efficient energy use.

To conserve energy and correspondingly reduce waste, it can be desirable to limit the size of the heater along the plane of the structure as long as the thermal zone has appropriate coverage of the selected portions of the waveguides. In some embodiments, the heater can be constrained in the plane of the device (generally evaluated from the top view) to be overlapping and/or between the heated waveguides to provide for effective heating, while in other embodiments, the heater can comprise two heater elements each biased with a corresponding heated waveguide with diffused heating from each heater element providing common heating of both waveguides. Thus, the heater can comprise one, two or more heating elements. A balancing of these design considerations provides significant energy savings for the optical phase shifters described herein. Through the constraint of the extent of the thermal zone along the plane of the device, nearby unheated waveguides on the planar structure can be placed closer to the heated waveguides without resulting in undesirable heating of the waveguides that are not intended to be heated.

In an embodiment as depicted in a schematic top view in FIG. 1 with relationships referenced in the plane of the device, a thermo-optic phase shifter 100 comprises a heater 101 with an associated thermal zone 102, and an optical waveguide 103 comprising a first heated waveguide section 104 within thermal zone 102, a second heated waveguide section 105 within thermal zone 102, a looped waveguide section 106 that connects heated waveguide sections 104, 105, a first connecting waveguide section 107 that provides for optical connection to thermo-optic phase shifter 100 adjacent first heated waveguide section 104, and second connecting waveguide section 108 that provides for optical connection to thermo-optic phase shifter 100 adjacent second heated waveguide section 105. Thermal zone 102 extends in the plane beyond the boundary of heater 101 that is configured to heat the thermal zone, and the temperature increase relative to ambient temperature within the thermal zone is higher than a neighboring region 109 including areas outside of thermal zone 102. Areas of neighboring region 109 are unheated from ambient temperature or only heated below a threshold value, specified above as a temperature increase of no more than about a half of the maximum temperature increase above ambient, under normal operating conditions. Waveguide sections 106, 107, 108 are not significantly heated due their location within neighboring region 109 outside of thermal zone 102. Herein, the waveguide sections 104, 105 are referred to collectively as the heated waveguide sections.

Figure 2:
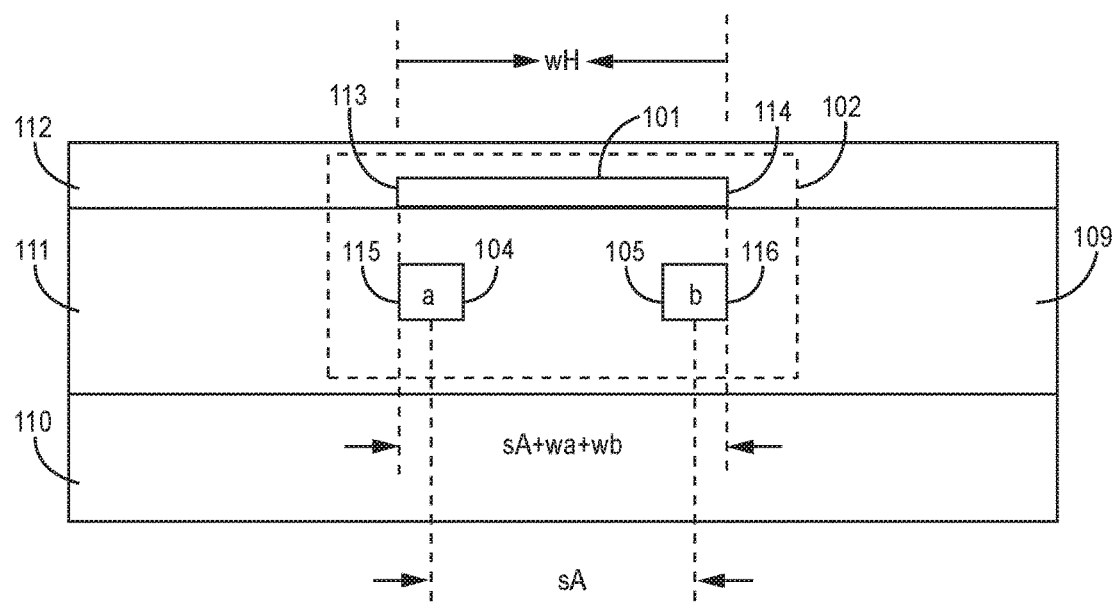
FIG. 2 is a schematic cross section view of the thermo-optic phase shifter in FIG. 1 taken along line 2-2.

For the thermo-optic phase shifter according to FIG. 1, the relative locations perpendicular to the plane of the device of heater 101, first heated waveguide section 104, and second heated waveguide section 105 are depicted in the cross section view in FIG. 2. FIG. 2 depicts an optional substrate 110, cladding 111 and an optional protective top coat 112. In the embodiment of FIG. 1, the optical waveguide passes through the thermal zone twice, once where the first heated waveguide section is within the thermal zone and a second instance where the second heated waveguide section is within the thermal zone. Because the optical waveguide passes through the thermal zone twice, the optical phase shift caused by a fixed electrical power applied to the heater is roughly double the value relative to the optical phase shift caused by an equivalent design (e.g., a design with equivalent heater and waveguide dimensions) where the optical waveguide passes through the thermal region only once. Hence, the embodiment depicted in FIG. 1 can have roughly double or greater efficiency relative to a similar design where the optical waveguide passes through the thermal region only once. Improved size reduction and device design flexibility can be achieved through curving the heated sections of the waveguide while maintaining energy efficiency, as described further below.

FIGS. 1 and 2 illustrate in this embodiment that the heater width, wH, is selected such that heater outer edges 113, 114 are approximately aligned in the plane of the structure with outer edges 115, 116 of heated waveguides 104, 105, respectively. Since sA is measured as a center to center distance between the waveguides and wH is measured as an edge to edge distance, wH is greater than the center to center separation between the two heated waveguide sections, sA. The half widths, i.e., widths divided by 2, in the plane of the waveguides can be specified as wa for waveguide 104 and wb for waveguide 105 such that wH=sA+wa+wb, as marked in FIG. 2. The efficiencies exhibited by the designs described herein are based upon an appreciation that the thermal zone extends beyond the area of the heater and the heater portions between the waveguides in the plane contributes to the heating of both waveguides due to thermal conduction. While the design in FIGS. 1 and 2 can provide improved efficiencies relative to a single waveguide passing through the heated zone, a significant area of the structure beyond the waveguides is still heated significantly. To provide additional efficiencies, the heater and heated zones can be further reduced in size. Two ways to effectively do this are described, and after these are described generally, an overall summary is provided of the efficient heater designs based on the passage of two waveguide segments through the heated zone. The first of these two approaches to reduce the heater size involves a decrease in the width of the heater while keeping the center of the heater between the two waveguides, and the second of these approaches involves splitting the heater into two portions, each displaced toward one of the waveguides with a gap between the heater portions in the center space between the waveguides.

Figure 3:
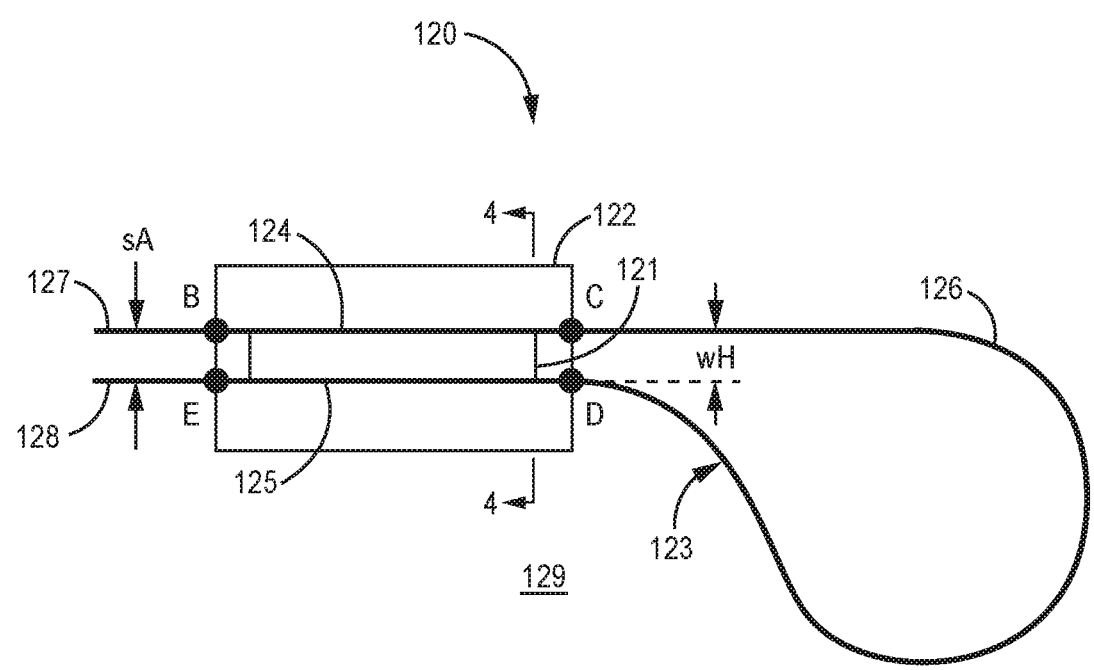
FIG. 3 is a schematic top view of an alternative embodiment of a thermo-optic phase shifter having an alternative heater layout.
Figure 4:
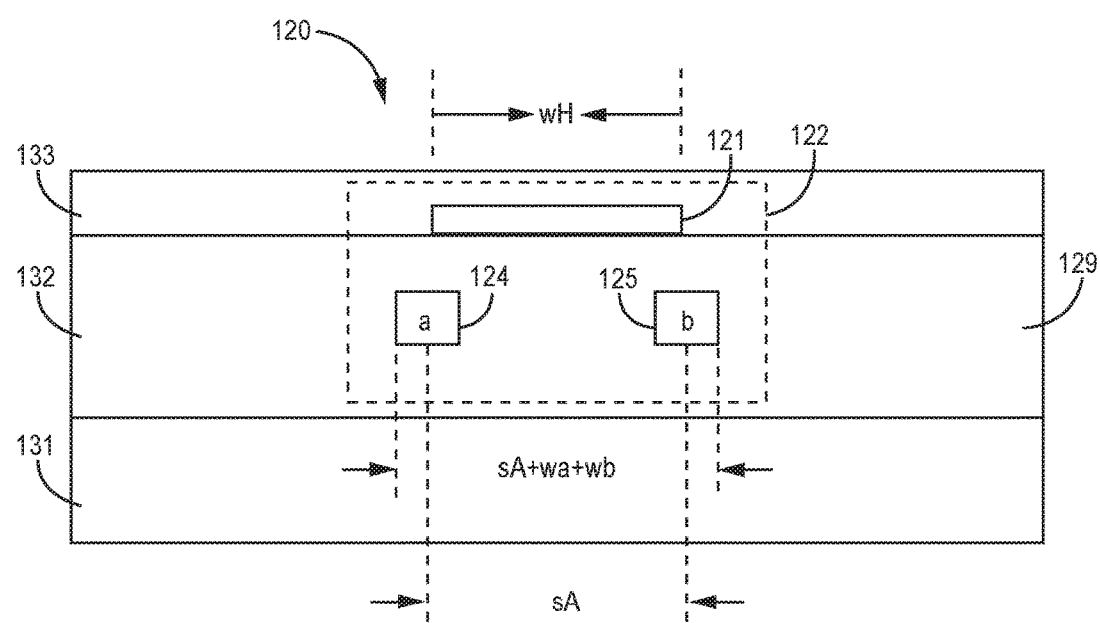
FIG. 4 is a schematic cross section view of the thermo-optic phase shifter of FIG. 3 taken along line 4-4.

In a first alternative embodiment depicted in FIGS. 3 and 4, the heater is reduced in width while the outer edges still overlap in the plane with the waveguides. Referring to FIG. 3, a thermo-optic phase shifter 120 comprises, a heater 121 with an associated thermal zone 122, and an optical waveguide 123 comprising a first heated waveguide section 124 within thermal zone 122, a second heated waveguide section 125 within thermal zone 122, a looped waveguide section 126 that connects the heated waveguide sections 124, 125, a first connecting waveguide section 127 that provides for optical connection to thermo-optic phase shifter 120 adjacent first heated waveguide section 124, and second connecting waveguide section 128 that provides for optical connection to thermo-optic phase shifter 120 adjacent second heated waveguide section 125. Waveguide sections 126, 127, 128 are not significantly heated due their location within neighboring region 129 outside of thermal zone 122. Due to the nature of the drawings in FIGS. 1 and 3, in this top view, the differences in the relationships between the heater and the heated waveguides cannot be distinguished between the two embodiments of the thermo-optic phase shifters. So in this view, all that can be seen is a decrease in the width of the thermal zone in FIG. 3 relative to FIG. 1. But the relevant changes in the heater placement are depicted in the cross sectional view of FIG. 4.

Referring to FIG. 4, the relative locations in a sectional view are depicted for thermal zone 122, heater 121, first heated waveguide section 124, and second heated waveguide section 125. FIG. 4 depicts an optional substrate 130, cladding 131 around the waveguide cores, and an optional protective top coat 132 covering heater 212. In the thermo-optic phase shifter embodiment of FIGS. 3 and 4, in the plane of the device, heater 121 overlaps with a portion of heated waveguide sections 123, 124 and covers the space between heated waveguide sections 123, 124. The value of wH for heater 121 is smaller than the value of wH for heater 101 of FIGS. 1 and 2, while sA is equivalent in the two embodiments. For the embodiment in FIG. 4, wH<sA+wa+wb. A further embodiment is shown in FIGS. 5 and 6 in which the width of the heater is further reduced to be between the heated waveguide sections along the plane of the device but not overlapping with the heated waveguide sections.

Figure 5:
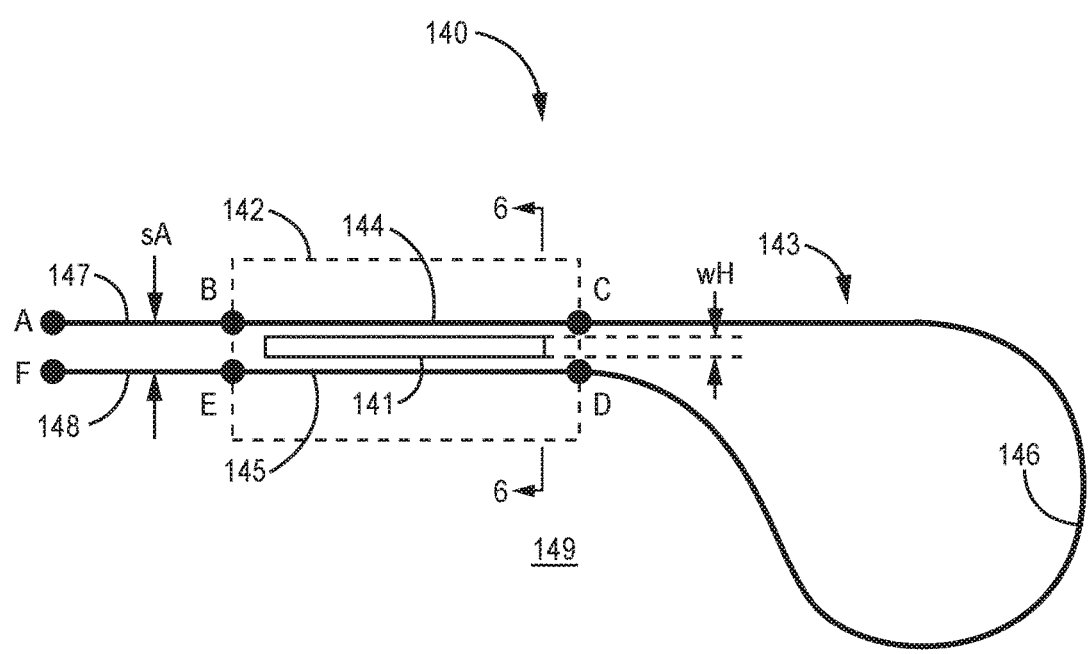
FIG. 5 is a schematic top view of a further alternative embodiment of a thermo-optic phase shifter having a heater that is reduced in width to be located between the adjacent heated waveguide segments.

Referring to FIG. 5, a thermo-optic phase shifter 140 comprises, a heater 141 with an associated thermal zone 142, and an optical waveguide 143 comprising a first heated waveguide section 144 within thermal region 142, a second heated waveguide section 145 within thermal region 142, a looped waveguide section 146 that connects the two heated waveguide sections 144, 145, a first connecting waveguide section 147 that provides for optical connection to thermo-optic phase shifter 140 adjacent first heated waveguide section 144 and second connecting waveguide section 148 that provides for optical connection to second heated waveguide section 145. In this embodiment, heater 141 is entirely between the heated waveguide sections in the plane of the device. In other words, for this embodiment wH<sA−wa−wb. Waveguide sections 146, 147, 148 are not significantly heated due their location within neighboring region 149 outside of thermal zone 142. The configuration of heater 141 relative to the heated waveguide sections is further depicted in the sectional view of FIG. 6.

Figure 6:
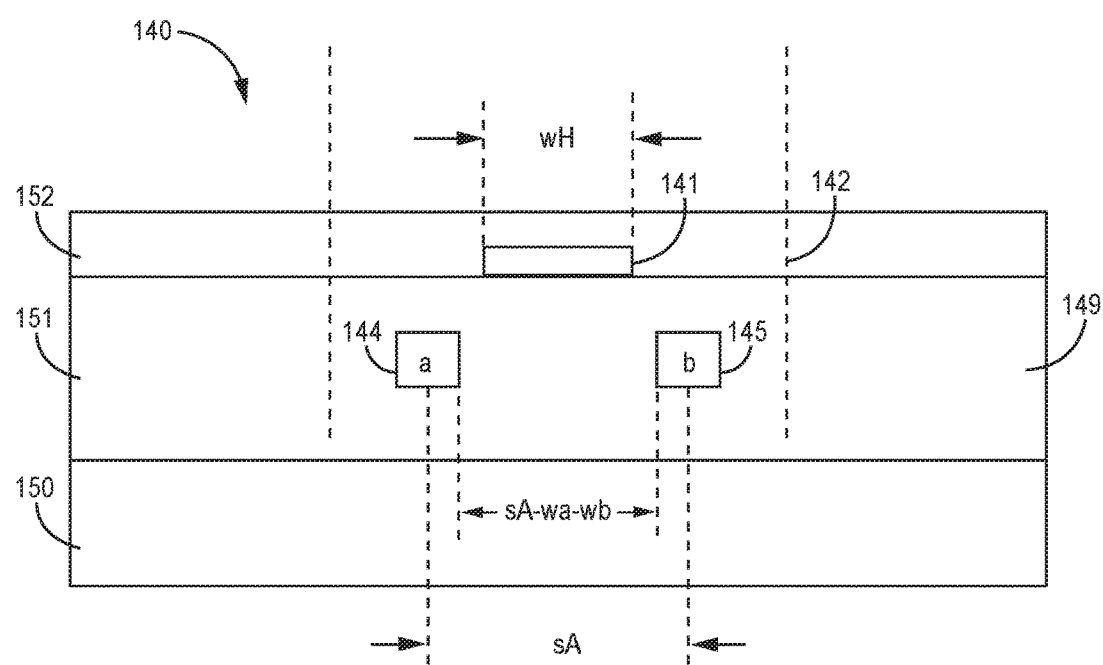
FIG. 6 is a schematic cross section view of the thermo-optic phase shifter of FIG. 5 taken along line 6-6.

Referring to FIG. 6, the relative locations in a sectional view are depicted for thermal zone 142, heater 141, first heated waveguide section 144, and second heated waveguide section 145. FIG. 6 depicts an optional substrate 150, cladding 151 surrounding the heated waveguide sections, and an optional protective top coat 152 over heater 141. Neighboring region 159 of the device surrounds thermal zone 152. In the thermo-optic phase shifter embodiment of FIGS. 5 and 6, in the plane of the device, heater 141 is between heated waveguide sections 143, 144 and covers a fraction of the space between heated waveguide sections 143, 144. A further embodiment of a thermo-optic phase shifter is shown in FIGS. 7 and 8 in which the area of the heater is reduced by dividing the heater into two sections with a gap in the space between the adjacent heated waveguide sections.

Figure 7:
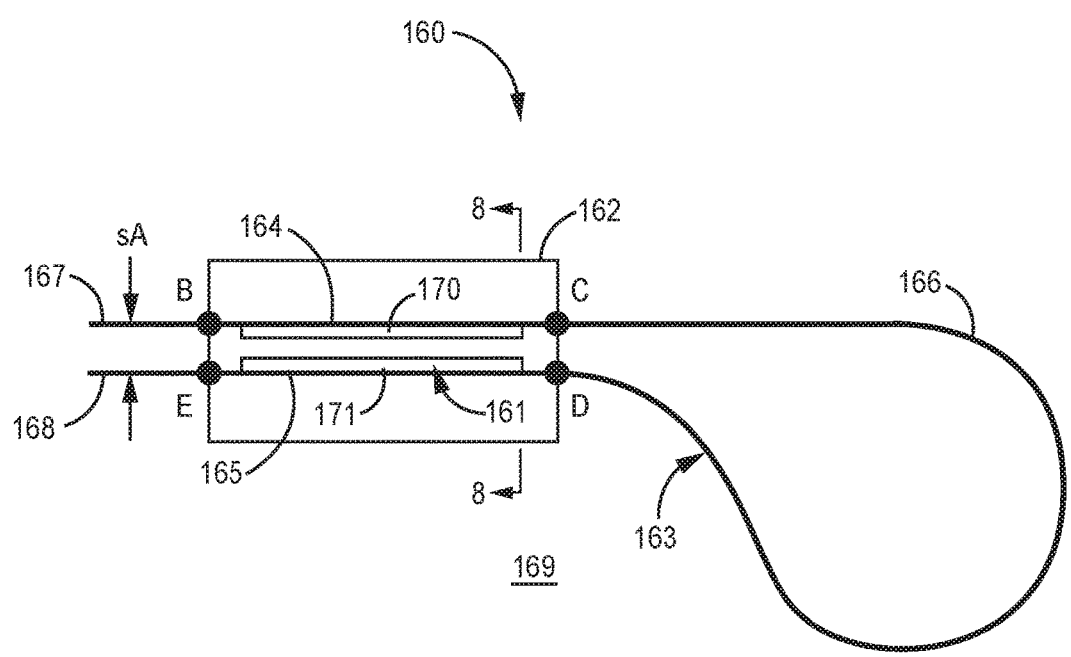
FIG. 7 is a schematic top view of a thermo-optic phase shifter with a heater comprising two heater segments with a gap separating the heater segments between the adjacent heated waveguides.

Referring to FIG. 7, a thermo-optic phase shifter 160 comprises, a heater 161 with an associated thermal zone 162, and an optical waveguide 163 comprising a first heated waveguide section 164 within thermal zone 162, a second heated waveguide section 165 within thermal zone 162, a looped waveguide section 166 that connects the two heated waveguide sections 164, 165, first connecting waveguide section 167 that provides for optical connection to thermo-optic phase sifter 160 adjacent first heated waveguide section 164, and second connecting waveguide section 168 that provides for optical connection thermo-optic phase sifter 160 adjacent to second heated waveguide section 165. Waveguide sections 166, 167, 168 are not significantly heated due their location within neighboring region 169 outside of thermal zone 162. Heater 161 comprises a first heater section 170 and a second heater section 171. First heater section 170 is associated with first heated waveguide section 164, and second heater section 171 is associated with second heated waveguide section 165. In this embodiment, the heater is segmented into two sections each associated with one of the heated waveguide section and with a gap between the heated sections located between the heated waveguide sections in the plane of the device. The configuration of this embodiment is further depicted in the sectional view of FIG. 8.

Figure 8:
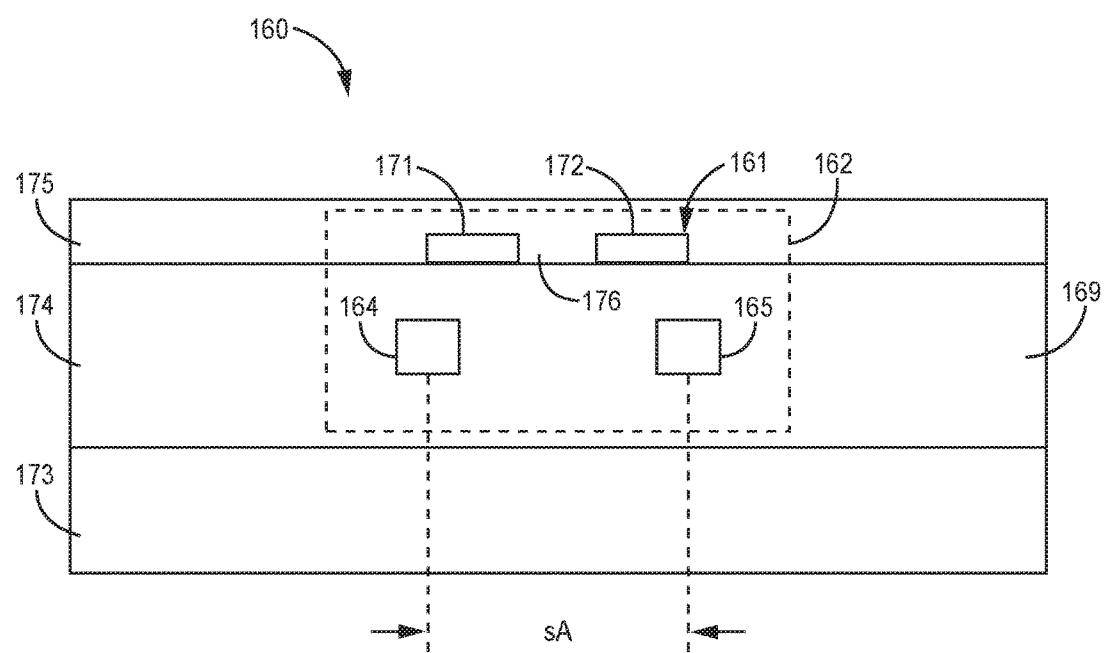
FIG. 8 is a schematic cross section view of the thermo-optic phase shifter of FIG. 6 taken along line 8-8.

Referring to FIG. 8, the relative locations in a sectional view are depicted for thermal region 162, heater 161 (first heater section 170 and second heater section 171), first heated waveguide section 164, and second heated waveguide section 165. FIG. 8 depicts an optional substrate 173, cladding 174 and an optional protective top coat 176. Neighboring region 179, that is unheated or heated below a threshold amount, surround thermal zone 172. In the thermo-optic phase shifter embodiment of FIGS. 7 and 8, in the plane of the device, heater 161 has a gap 176 between first heater section 170 and second heater section 171. In a view along the plane of the device (FIG. 7), gap 176 covers the remaining portion of the space between waveguides 143, 144 not covered by heater 161. In this embodiment, the outer edges of heater sections 170, 171 do not extend outward to the outer edges of first heated waveguide section 164 and second heated waveguide section 165 along the width of the structure in the plane of the device.

Figure 9:
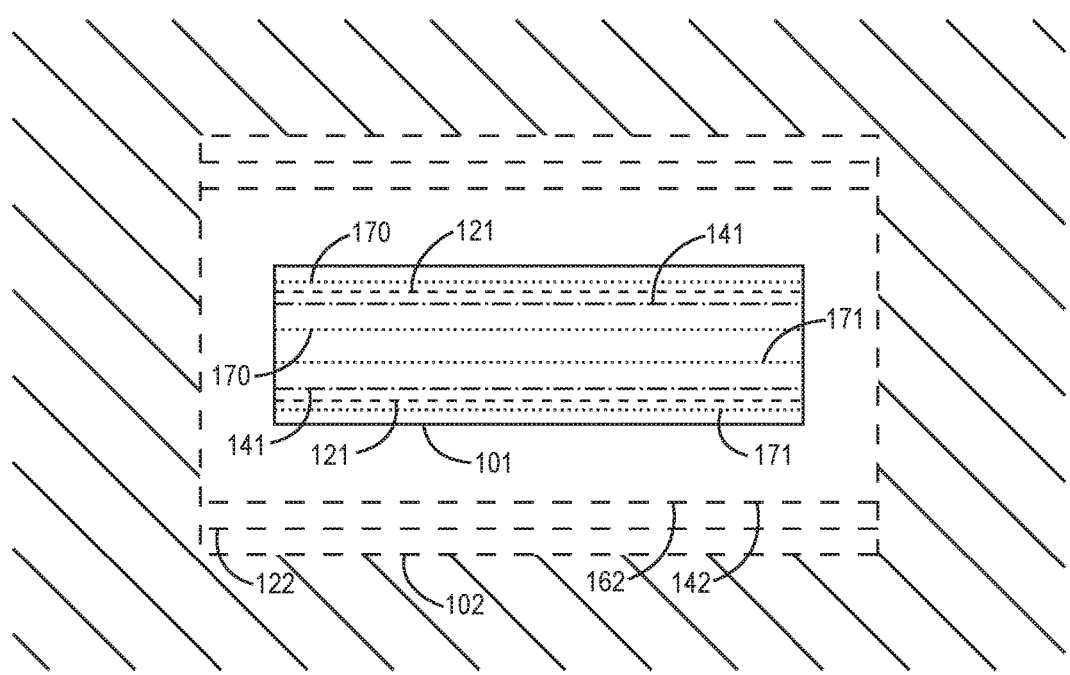
FIG. 9 is a schematic layout of top views depicting the relative positions of four distinct heater configurations providing three distinct thermal zones in which the waveguides are not shown for clarity.

There are practical design issues of relevance to the design of the thermo-optic phase shifters. The heater designs of FIGS. 1-8 are summarized in FIG. 9. In this collective top view of the different embodiments, the collective depiction shows three thermal zones 102, 122, and (142,162). Thermal zones 142 and 162 are shown to be approximately equivalent, although this is not necessarily true, but is assumed for convenience of representation. Heater 101 covers the area of the other heaters and is depicted with a solid line. The four heaters are depicted as having the same length for convenience. Heater 121 is depicted with a dashed line to distinguish this heater. Heater 141 is depicted uniquely with a dashed-dot line. The two heater elements 171, 172 of heater 161 are depicted in FIG. 9 with dotted lines. The placement and scaling is just schematic, but the drawing is intended to reflect the ranges of heater placements that can effectively be used in the energy efficient designs.

Within the thermal zone, a temperature can be selected to achieve a desired phase shift. The actual performance, even assuming linear thermal response which is an appropriate approximation under expected commercial operating conditions, is influenced by many parameters that influence the actual performance, such as material used to form the structure, the dimensions of the waveguide cores, thicknesses of all of the layers, heat dissipation, and other features of the device. These design parameters influence thermal conduction along with other performance criteria. The efficient designs described herein balance practical design constraints while improving the energy efficiency significantly. Within these concepts of efficient heater designs, the design of the optical components can help evaluate the selection of the specific heater designs within the general descriptions herein.

The placement of the adjacent waveguide sections to be heated is constrained by the possibility of undesirable optical coupling between the adjacent waveguide sections that can result in optical crosstalk and thereby result in degraded performance of the device. Generally, the waveguide sections are placed far enough apart to obtain acceptable low levels of crosstalk. If the adjacent waveguide sections are curved, the difference in radius of curvature between the adjacent curved waveguide sections results in phase misalignment as the signals transmit through the adjacent waveguide sections that naturally reduces the optical coupling leading to crosstalk. Due to the reduced crosstalk at an equivalent spacing of adjacent waveguide sections, adjacent curved waveguide sections can be placed closer to each other with acceptable crosstalk/noise of a transmitted signal. The combination of the curved heated waveguide sections and the heater placements described herein provide for particularly efficient designs.

Figure 10:
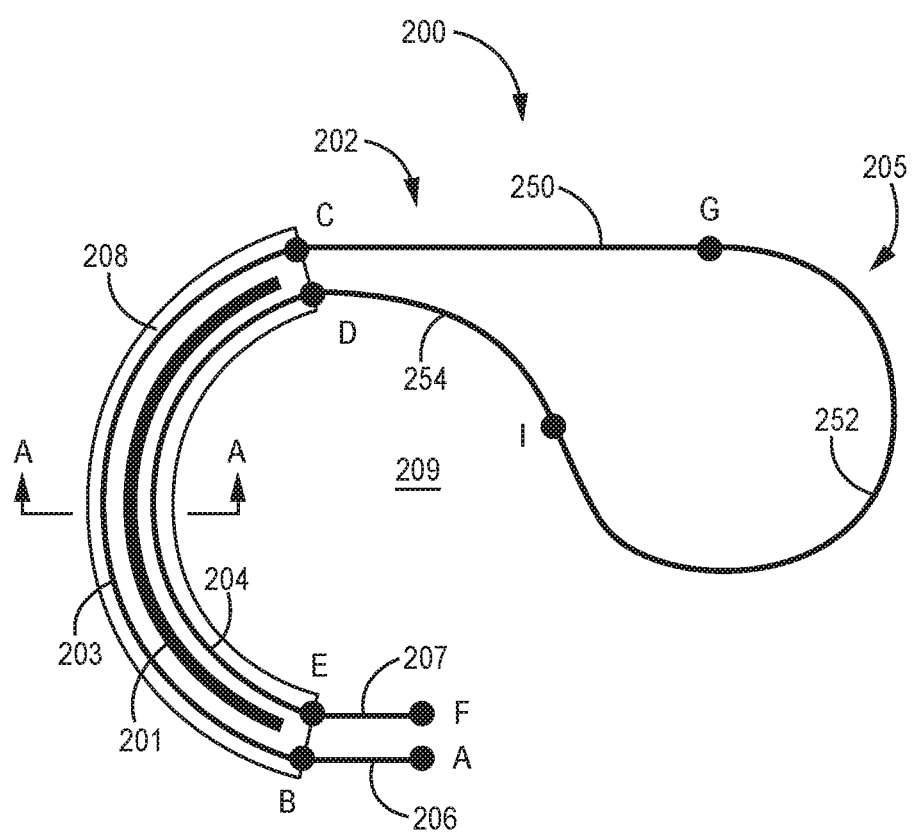
FIG. 10 is an embodiment of a thermo-optic phase shifter with curved adjacent waveguide segments within a common thermal zone, in which a general heater is depicted with a cross section indicated along line A-A.

An embodiment of a thermo-optic phase shifter 200 with curved heated sections is depicted in a schematic top view in FIG. 10. Thermo-optic phase shifter 200 comprises a heater 201, and an optical waveguide 202 comprising a first curved heated optical waveguide section 203 (situated between point B and point C), a second curved heated optical waveguide section 204 (situated between point D and point E), a loop back optical waveguide section 205 (situated between point C and point D) that optically connects the first and second curved optical waveguide sections, a first connecting waveguide section 206 optically providing optical connection to thermo-optic phase shifter 200 adjacent to first curved heated optical waveguide section 203, and a second connecting waveguide section 207 optically connecting thermo-optic phase shifter 200 adjacent to second curved heated optical waveguide section 204. Heater 201 provides a thermal zone 208 in the plane of the waveguides configured so that the average temperature within the thermal zone is higher than a neighboring region 209 located outside of thermal zone 201. As noted above, the boundary of thermal zone 208 can be specified according to the heat increase over ambient is half of the maximum temperature increase resulting from operation of the heater. First curved heated optical waveguide section 203 and second curved heated optical waveguide section 204 are within the thermal zone 208, and loop back optical waveguide section 205, first connecting waveguide section 206 and second connecting waveguide section 207 are within neighboring region 209. The portions of the waveguide 202 that are significantly heated are the portions that are within the thermal zone 208, which extends in the plane beyond heater 201 area due to thermal conduction, and portions of the waveguide 202 that are within neighboring region 209 can be considered effectively as unheated.

The schematic depiction of heater 201 in FIG. 10 is not intended to imply that the heater is exclusively between heated waveguide sections, but it is intended to be a general depiction of the full range or any subset, of efficient heater placements described herein. For example, heater 201 can be configured relative to the heated waveguides with any of the heater configurations shown in FIGS. 1-8 and summarized in FIG. 9. The cross sectional view noted by A-A in FIG. 10, then can correspond to any of the views in FIGS. 2, 4, 6 and 8. Using the same optical materials, the distance sA between the curved waveguides can be less than the value between the straight waveguide sA in FIGS. 1-8. Consequently, the waveguides can be configured to be closer to the center of the thermal zone thereby achieving greater thermal efficiency. Representative embodiments for heater 201 relative to the curved heated waveguide sections are provided below in the context of FIGS. 13-19.

To provide desired energy efficiency, the projection of heater 201 into the plane of optical waveguide 202 has a radius of curvature mimicking the radius of curvature of the adjacent curved heated waveguide sections 203, 204. As noted in the previous paragraph, FIG. 10 is not intended to depict a particular width of the projection of the heater, but FIG. 10 is intended to show the general shape of the projection of the heater in the plane. The planar projection of the heater is characterized by a length, width and radius of curvature, which is roughly of the magnitude of the radius of curvature of the waveguides, although the specific numbers depend on the width and specifics of the heater placement. The radius of curvature at the center of the heater projection along the width of the heater projection can be approximately the average of the radii of curvature of curves heated waveguide sections 203, 204 since the heater can be approximately centered over the middle of the space between the heated waveguide sections. The curved heater projection provides for energy efficient heating in conjunction with the curvature of the waveguide sections to allow the waveguide sections to be closer together.

In the embodiment of FIG. 10, the optical waveguide 202 can be described in greater detail by describing the nominal physical path of the optical waveguide as a parametric curve using "t" as the parameter of the curve, where t=0 at point A and t=1 at point F, each of which are illustrated in FIG. 10. The nominal physical path is distinguished from the exact physical path because the nominal physical path does not include sub-wavelength perturbations such as waveguide offsets at the transitions between straight waveguide and curved waveguides that is a common practice in the art. The signed curvature is negative at any point P along the curve wherein an increasing value of parameter t causes a clockwise trajectory. The signed curvature is positive at any point P along the curve wherein an increasing value of parameter t causes a counterclockwise trajectory. The signed curvature is zero at any point P along the curve wherein an increasing value of parameter t causes a linear trajectory. As illustrated in FIG. 10, the first curved heated optical waveguide section 203 has a signed curvature that has a constant value that is negative along the entire length of the section, and the second curved heated optical waveguide section 204 has a signed curvature that has a constant value that is positive along the entire length of the section. However, other embodiments are anticipated for which the first curved heated optical waveguide section 203 has a signed curvature that varies along the segment length and may even have points along the segment for which the signed curvature is zero in value. For example, the first curved heated optical waveguide section may follow a spline curve or, alternatively, may have one or more linear segments alternating with nonlinear segments. Likewise, other embodiments are anticipated for which the second curved heated optical waveguide section 204 has a signed curvature that varies along the segment length and may even have points along the segment for which the signed curvature is zero in value. FIG. 10 depicts an embodiment that provides desirable compactness by configuring the first curved heated optical waveguide section 203 and the second curved heated optical waveguide section 204 with signed curvature values that have similar magnitudes and opposite signs.

For a fixed waveguide separation, the embodiment depicted in FIG. 10, reduces the optical crosstalk relative to the embodiment depicted in FIGS. 1, 3, 5, and 7 by breaking the phase matching condition. Light that propagates through one straight waveguide will stay in phase with light that propagates through a second straight waveguide that is equivalent in design and parallel with the first waveguide. In other words, the phase matching condition is maintained for two waveguide that are equivalent, straight and parallel. When the phase matching condition is maintained, optical crosstalk is increased. However, light that propagates through one curved waveguide will not stay in phase with light that propagates through a second curved waveguide that is equivalent in design and adjacent with the first waveguide. In other words, the phase matching condition is not maintained for two waveguide that are equivalent, curved and adjacent. When the phase matching condition is broken, for a fixed waveguide separation, optical crosstalk is reduced.

By using curved waveguides, as depicted in FIG. 10, for a given limit on optical crosstalk, the waveguide separation can be reduced. By configuring the waveguides with reduced separation, the embodiment depicted in FIG. 10 can have improved thermal efficiency with appropriate heater design. Furthermore, increased efficiency can be achieved by configuring the separation, sA, between first curved heated optical waveguide section 203 and the second curved optical waveguide section 204 to have a constant value that is the minimum value determined by the optical crosstalk restriction. This configuration can be achieved by configuring the first curved heated optical waveguide section 203 and the second curved heated optical waveguide section 204 to lie along arcs of mutually concentric circle wherein the radius of the two circles differs by a value equal to minimum waveguide separation allowed by the optical crosstalk requirement. Our experimental measurements with similar devices demonstrate that substantial heater efficiency improvement when sA has a value of 20 microns or less for an embodiment in commercial grade silica glass planar lightwave circuits with a configuration depicted in FIG. 10. Additional details related to the values of the signed curvature that can optimize compactness and efficiency are described below.

Figure 11:
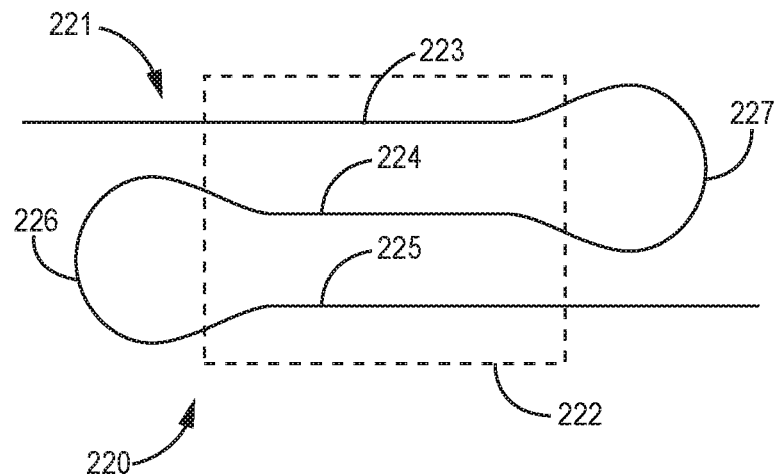
FIG. 11 is a top view of a prior art thermo-optic phase shifter in which three adjacent sections of waveguide are simultaneously heated with a single heater.
Figure 12:
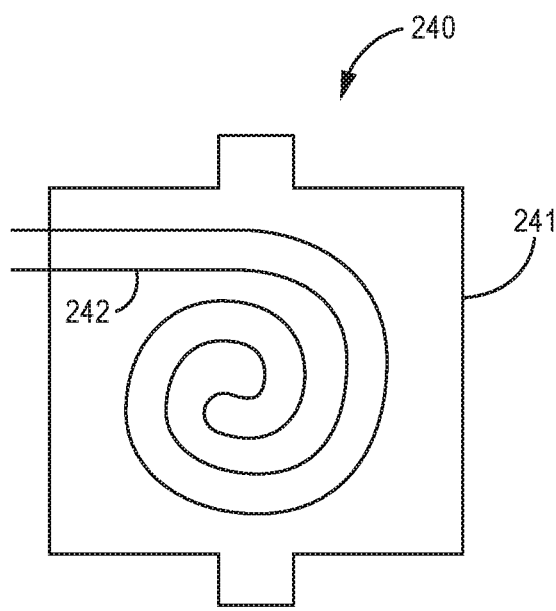
FIG. 12 is a top view of another prior art thermo-optic phase shifter with a rolled up waveguide under a single heater covering the rolled up waveguide.

An alternative way to attempt to reduce the power consumption relative to traditional designs of a thermo-optic phase shifter is described in U.S. Pat. No. 7,627,203 B2 to Chen (hereinafter Chen), entitled "Thermo-Optic Devices Providing Thermal Recirculation," incorporated herein by reference. An embodiment from Chen (essentially Chen FIG. 4) is shown in FIG. 11. Thermo-optic phase shifter 220 of FIG. 11 comprises waveguide 221 and heater 222. As shown in this figure, waveguide sections 223, 224 and 225 that are entirely directly below the heater each include linear sections and portions of curved bend sections, although the claims of Chen are directed to heating of only linear sections. Loop sections 226, 227 are not below heater 222. Chen show thermal region 228 as covering the same planar area as heater 222 (which are referred to in Chen as thermal device 28 defining thermal region 38 having boundaries 40, 42). While Chen identifies both a heater and a thermal region, the planar areas associated with these features are not distinguished. The embodiments described herein take advantage of the distinction between the heater area and the thermal zone area to achieve desirable energy savings in a compact format. Thus, an appreciation of the relationship and distinctions between the heater area and thermal zone area is one significant factor for appreciating the energy efficiencies and compact formats identified in the present application. The design considerations in Chen significantly distinguish the teachings of Chen from the thermo-optic phase shifters in Applicant's designs. A further alternative design of a thermo-optic phase shifter with attempts to improve thermal efficiency is presented in U.S. Pat. No. 7,676,121 to Gill et al. (hereinafter Gill), entitled "Thermo-Optic Tuning of a Multi-Directional Optical Waveguide," incorporated herein by reference. Gill teaches configurations wherein a single heater that has a footprint formed by the perimeter of the heating element may apply the thermo-optic effect to multiple waveguide sections each of which are, at least partially located within the heater footprint; however, Gill does not teach how such devices may be configured to enable more compact MZI devices. An embodiment from Gill is shown in FIG. 12. Referring to this embodiment, thermo-optical phase shifter 240 comprises heater 241 and waveguide 242. Waveguide 242 is depicted with a looped back structure of the waveguide all under heater 240 so that the entire waveguide curved section of the waveguide being heated. Such a structure provides limited flexibility for device design. Significant differences distinguish thermo-optic phase shifter 240 from thermo-optic phase shifters of FIGS. 1-10 of the resent application.

For energy efficient operation of the thermo-optic phase shifter, the phase shift effect should be designed for control with respect to what segments of waveguide are effected with respect to phase shifting. Such design considerations are also significant with respect to incorporating the thermo-optic phase shifter into an overall PLC design, as discussed further below. The phase shift effects from heating generally drop off with distance from the heater, so that the physical design provides operational design control, in which physical design includes, for example, material selection and component placement. Heated segments of waveguide are placed close to heaters and unheated segments are placed further from heaters. To facilitate design aspects, the phase shifter design can be correspondingly selected with controlled phase shifting in mind. It may be desirable to design the heaters such that the thermal gradient across a waveguide width is not too excessive during use, and performance considerations can influence heater placement along with efficient thermal delivery to the waveguides.

Figure 13:
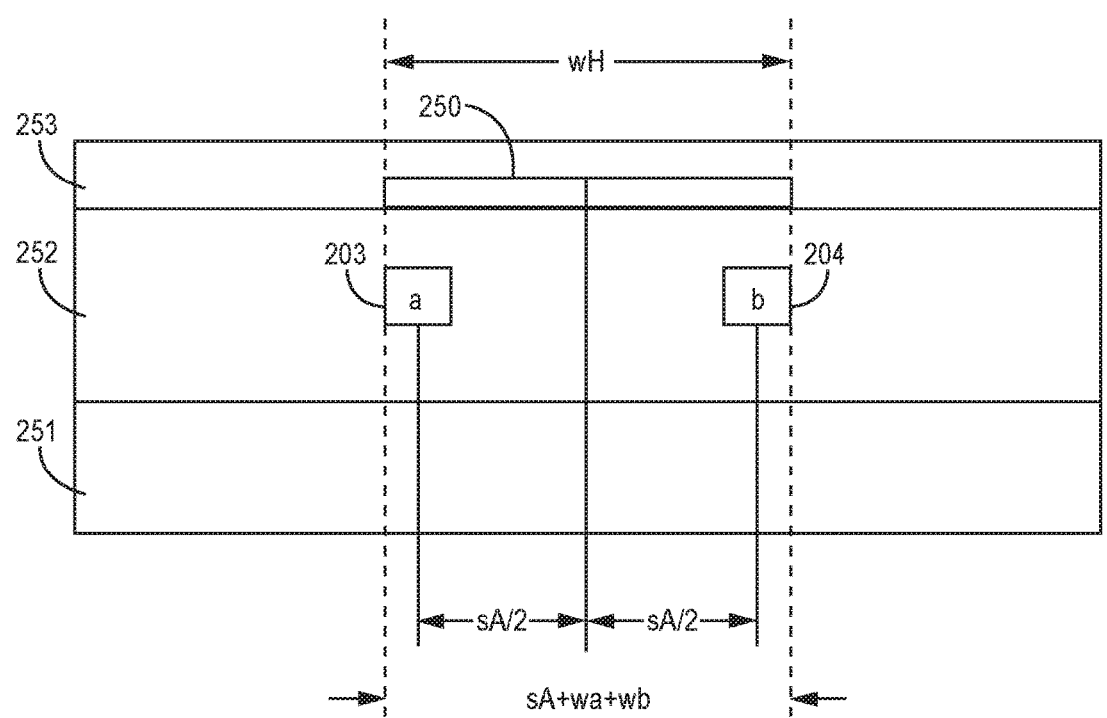
FIG. 13 is a sectional view of a first embodiment of a heater suitable for thermo-optic phase shifter of FIG. 10 having outer edges of the heater approximately aligned with the outer edges of adjacent heater waveguides.
Figure 14:
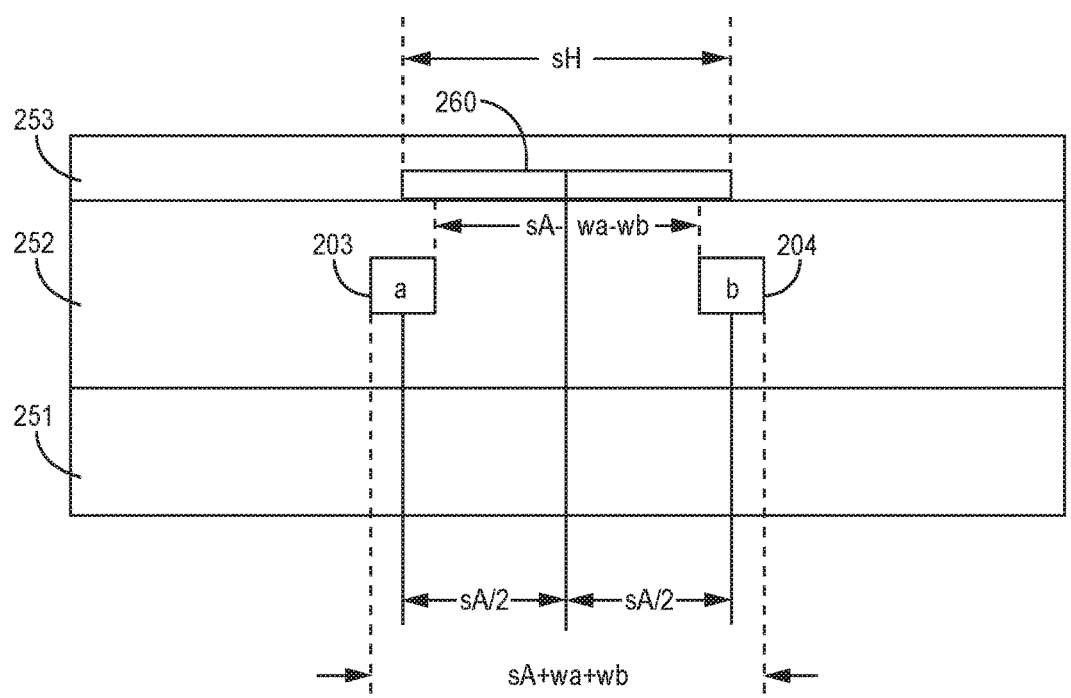
FIG. 14 is a sectional view of a second embodiment of a heater suitable for thermo-optic phase shifter of FIG. 10 having a smaller width relative to the heater of FIG. 13, but with outer edged over the adjacent heated waveguides in the plane of the device.
Figure 15:
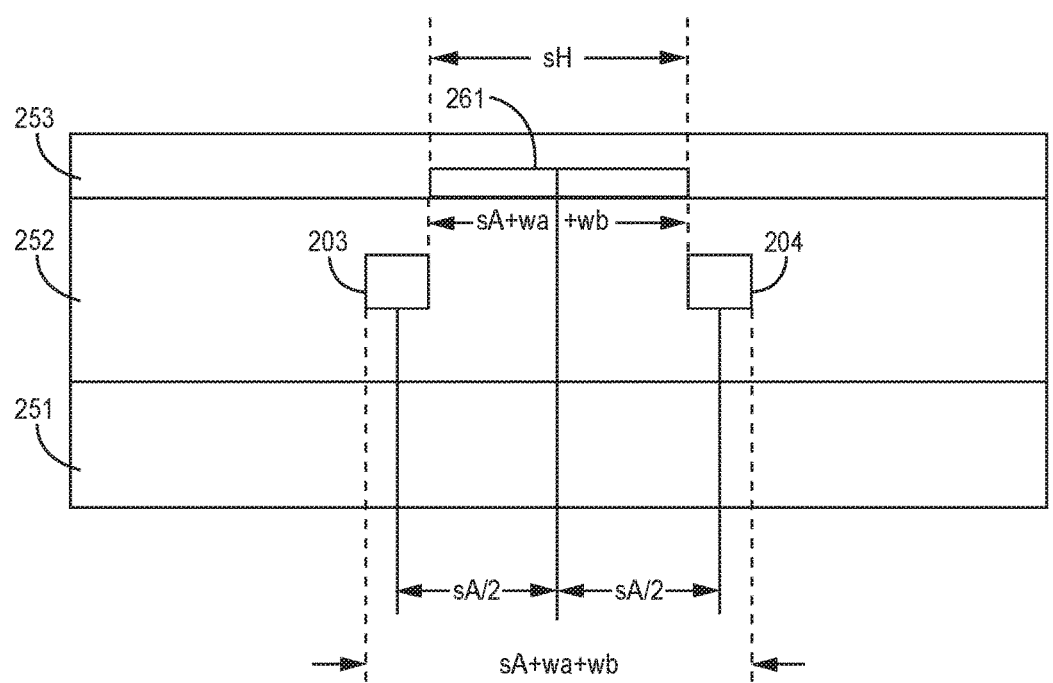
FIG. 15 is a sectional view of a third embodiment of a heater suitable for thermo-optic phase shifter of FIG. 10 having outer edges of the heater approximately aligned with the inner edges of adjacent heated waveguides in the plane of the device.
Figure 16:
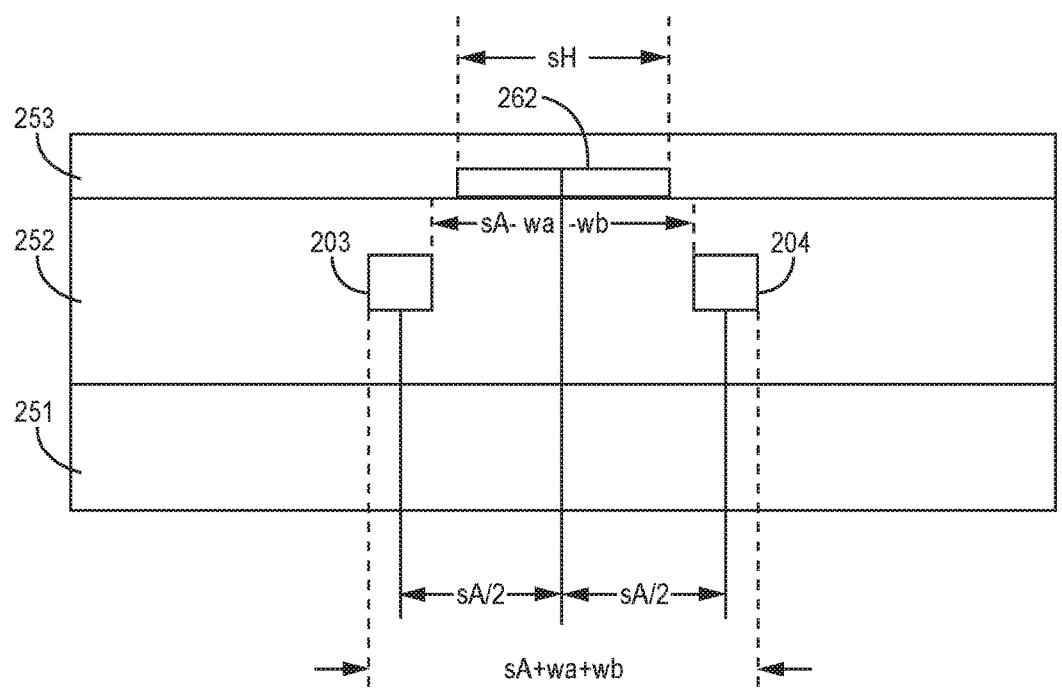
FIG. 16 is a sectional view of a forth embodiment of a heater suitable for thermo-optic phase shifter of FIG. 10 having outer edges of the heater in the plane of the device over the space between the adjacent heated waveguides.
Figure 17:
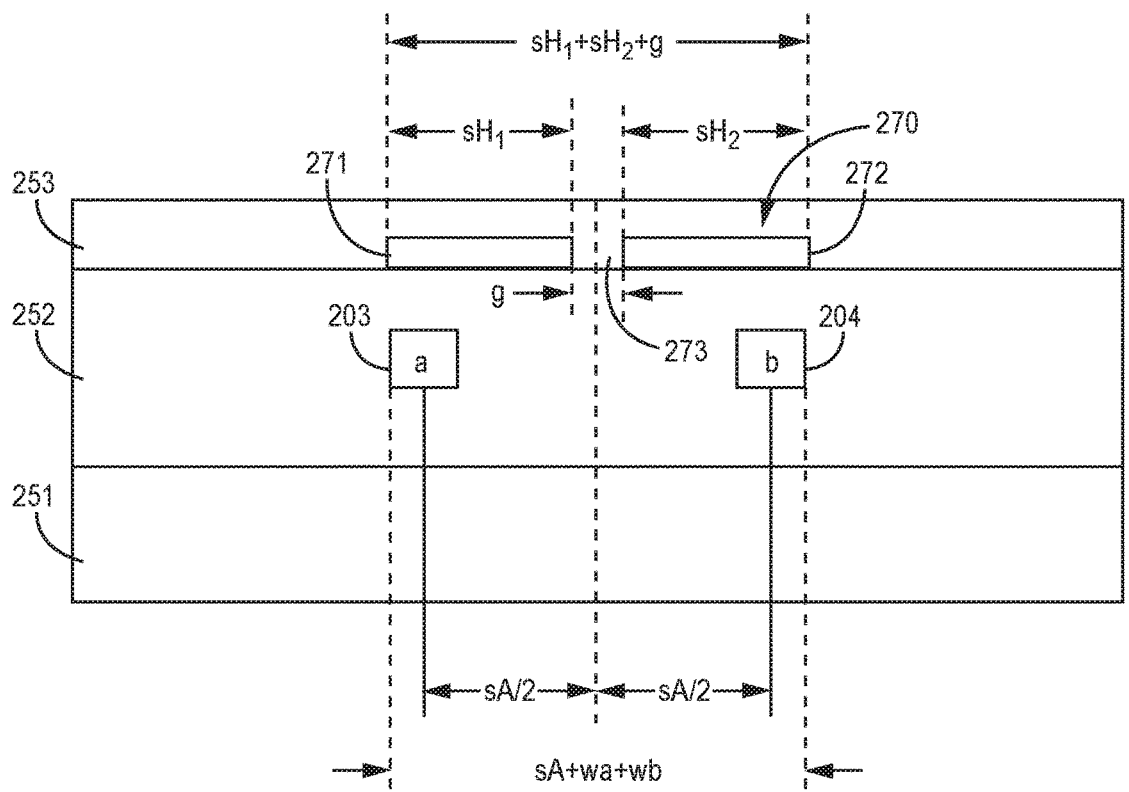
FIG. 17 is a sectional view of a fifth embodiment of a heater suitable for thermo-optic phase shifter of FIG. 10 having outer edges of the heater approximately aligned with the outer edges of adjacent heater waveguide and with a gap along the width between the adjacent heated waveguides.
Figure 18:
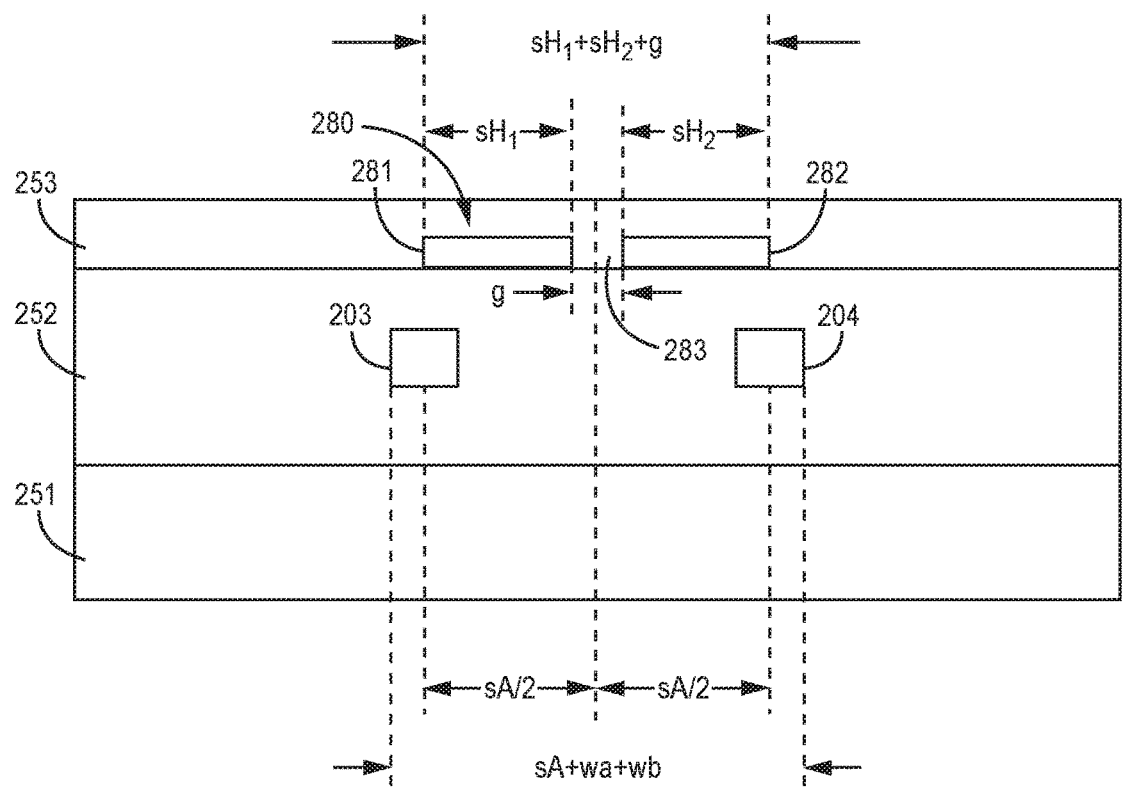
FIG. 18 is a sectional view of a sixth embodiment of a heater suitable for thermo-optic phase shifter of FIG. 10 having a gap in the heater width as shown for the heater in FIG. 17 and with outer edges of the two heater element positioned over the adjacent heated waveguides in the plane of the device.
Figure 19:
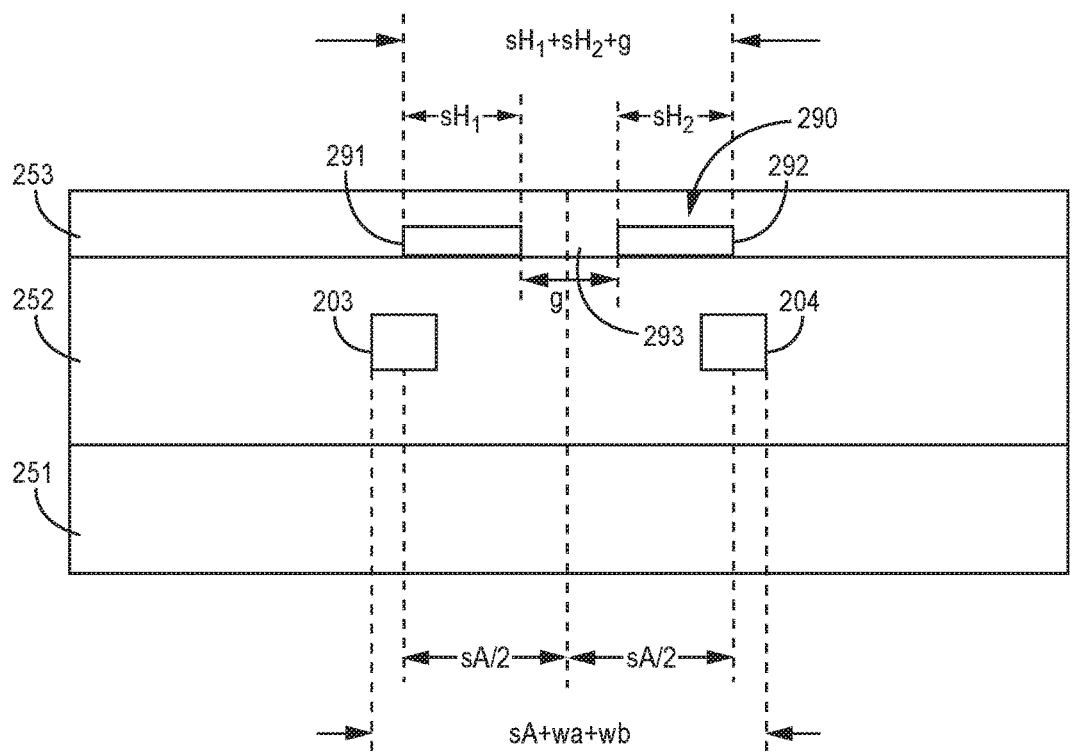
FIG. 19 is a sectional view of a seventh embodiment of a heater suitable for thermo-optic phase shifter of FIG. 10 having the widths of the two heater elements smaller than the corresponding heater elements in FIG. 18 so that the heater elements of FIG. 19 have a larger gap between the heater elements and outer edges of the heater elements closer to the center between them in the plane of the device.

As noted above with respect to FIG. 10, the heater schematically depicted in this figure can be designed in various configurations relative to the heated waveguides. Representative sets of heater configurations are shown in FIGS. 13-19. FIGS. 13-19 depict heater embodiments that are positioned with respect to the corresponding waveguide sections in an approximately symmetrical fashion to heat the two waveguide roughly equally, although such symmetrical configurations may not be needed to achieve desirable energy efficiencies. Specifically, FIG. 13 depicts a heater extending in the plane from the outer edges of heated waveguide sections 203, 204 spanning the region between the waveguides. FIGS. 14-16 depict heaters that are sequentially smaller while spanning the center of the space between the heated waveguide sections, and FIGS. 17-19 depict the splitting of the heater into two heater elements with a gap in the heater in the space between the heated waveguide sections. These embodiments are next discussed in more detail.

Referring to FIG. 13, heater 250 has a width in the plane of the device with outer edges approximately aligned with the outer edges of heated waveguide sections 203, 204. A center line is drawn in the heater just for visualization purposes. The thermo-optic phase shifter structure comprises an optional substrate 251, cladding 252 surrounding heated waveguide sections 203, 204 and optional protective coat 253. FIG. 13 shows the spacing between the centers of heated waveguide sections 203, 204 as sA. For this embodiment of the heater, the width of the heater sH is equal to the center to center distance between the waveguides plus the half widths of the two waveguide sections, wa for curved heated optical waveguide section 203 and wb for curved heated optical waveguide section 204. In use, heat from heater 250 is conducted into the waveguide cladding 252 and subsequently conducted into the heated waveguide sections 203, 204.

The elevated temperature of first curved heated optical waveguide section 203 introduces a phase shift onto the light that propagates through the first heated waveguide segment relative to corresponding propagation at ambient temperature. Similarly, the elevated temperature of second curved heated optical waveguide section 204 introduces a phase shift onto the light that propagates through the second heated waveguide section relative to propagation at ambient temperature. Because loopback waveguide 205 optically connects heated waveguide sections 203, 204, light that propagates through first curved heated optical waveguide section 203 also propagates through second curved heated optical waveguide section 204 and consequently, the phase shifts introduced within the active waveguide sections combine to produce a net phase shift that is the sum of the two individual phase shifts. Hence, by situating first curved heated optical waveguide section 203 and second curved heated optical waveguide section 204 in close proximity, the device can use the indirect heating contribution to make the phase shifter more efficient. Smaller separation between the first waveguide section and the second waveguide (that is, smaller sA values) can yield greater energy efficiency of the phase shifter with appropriate heater design within optical performance constraints.

Referring to FIG. 14, heater 260 is positioned with outer edges that overlap with heated waveguide sections 203, 204 in the plane of the structure. In this approximately symmetric structure, sA+wa+wb>sH>sA−wa−wb, where wa and wb are half widths of the respective heated waveguide sections. FIG. 15 depicts an embodiment of a heater 261 in which the width is decreased further. In the heater embodiment of FIG. 15, sH=sA−wa−wb, or in other words, the outer edges of heater 261 in the plane are approximately aligned with the inner edges of heated waveguide sections. FIG. 16 depicts a heater embodiment in which the width of the heater is less than the width between heated waveguide sections 203, 204. Thus, in the plane of the structure, heater 262 is between heated waveguide sections 203, 204 and does not overlap the waveguides in the plane. So for the heater embodiment in FIG. 16, sH<sA−wa−wb. The heaters in FIGS. 14-16 are depicted below optional coating 252 and on top of cladding 252. Together FIGS. 13-16 depict various widths of the heater that represent possible configurations from sH=sA+wa+wb to sH<sA−wa−wb. Additional embodiments of heater widths include other values of sH<sA+wa+wb in addition to the depicted values. In a commercial device design, various considerations can enter into a design selection including optical performance, layout in the PLC, and energy efficiency. Typical applications target energy efficiency to be between 0.5 degrees/mW and 1.5 degrees/mW, where the amount of phase shift of the light passing through the phase shifter is measured in degrees.

The effective shrinking of the heater width or more generally the heater area through the division into two heater elements is depicted in FIGS. 17-19. Referring to FIG. 17, a heater 270 is parsed into heater elements 271, 272 with a gap 273 separating the heater elements on the surface of cladding 252. In this embodiment, the outer edge of heater element 270 is approximately aligned with the outer edge of first curved heated optical waveguide section 203 in the plane of the structure, and the outer edge of heater element 271 is approximately aligned in the plane of the structure with the outer edge of second heated waveguide section 204. With $sH_1$, $sH_2$ and g representing respectively the width of heater 1, the width of heater 2 and the width of the gap, $sH_1+sH_2+g=sA+wa+wb$, where sA, wa an wb are defined above. Gap 272 represents a decrease in the area of heater 270 relative to heater 250 of FIG. 13. The introduction of gap 272 generally changes the thermal distribution of the device in use with the expectation of some thermal conduction from heater element 271 to second heated waveguide section 204 and from heater element 272 to first curved heated optical waveguide section 203, which can contribute to the energy efficiencies of the thermo-optic phase shifter.

Referring to FIG. 18, heater 280 is parsed into heater elements 281, 282 with a gap 283 separating heater elements 281, 282 on the surface of cladding 252. With respect to a comparison with heater 270 in FIG. 17, heater 280 has heater elements with outer edges moved toward the center of the space between heated waveguide sections 203, 204 relative to heater elements 271, 272. Thus for the heater embodiment in FIG. 18, $sH_1+sH_2+g<sA+wa+wb$. For illustration purposes in this embodiment, gap 283 in FIG. 18 is kept approximately equal to gap 273 in FIG. 17. Thus, heater 280 has a smaller total width of heater material relative to heater 270. The change in placement of the outer edges of heater elements of heater 280 generally can be expected to result in a smaller area of the corresponding thermal zone relative to the heater 270. Referring to FIG. 19, heater 290 is parsed into heater elements 291, 292 with a gap 293 separating heater elements 291, 292 along the surface of cladding 252. For illustration purposes, the widths of heater elements 291, 292 are decreased along both edges relative to heater elements 281, 282 of FIG. 18 resulting in a wider gap 293 relative to gap 283 and outer edges of heater elements 291, 292 closer relative to the center line of heater 290.

FIGS. 17-19 display heater embodiments that reduce their width of heater material across the plane of the structure perpendicular to the optical path defined by the waveguide at least in part through the introduction of a center gap between two heater elements. These embodiments of heaters can provide alternative thermal distributions relative to the heater embodiments in FIGS. 14-16 that also reduce their widths relative to the heater embodiment in FIG. 13. In general, the selection of a particular design can depend on various design parameters, optical performance, expectation of operation conditions, processing considerations and potentially additional factors. Generally, selected designs can provide efficient thermal operation for the thermo-optic phase shifter.

Figure 20:
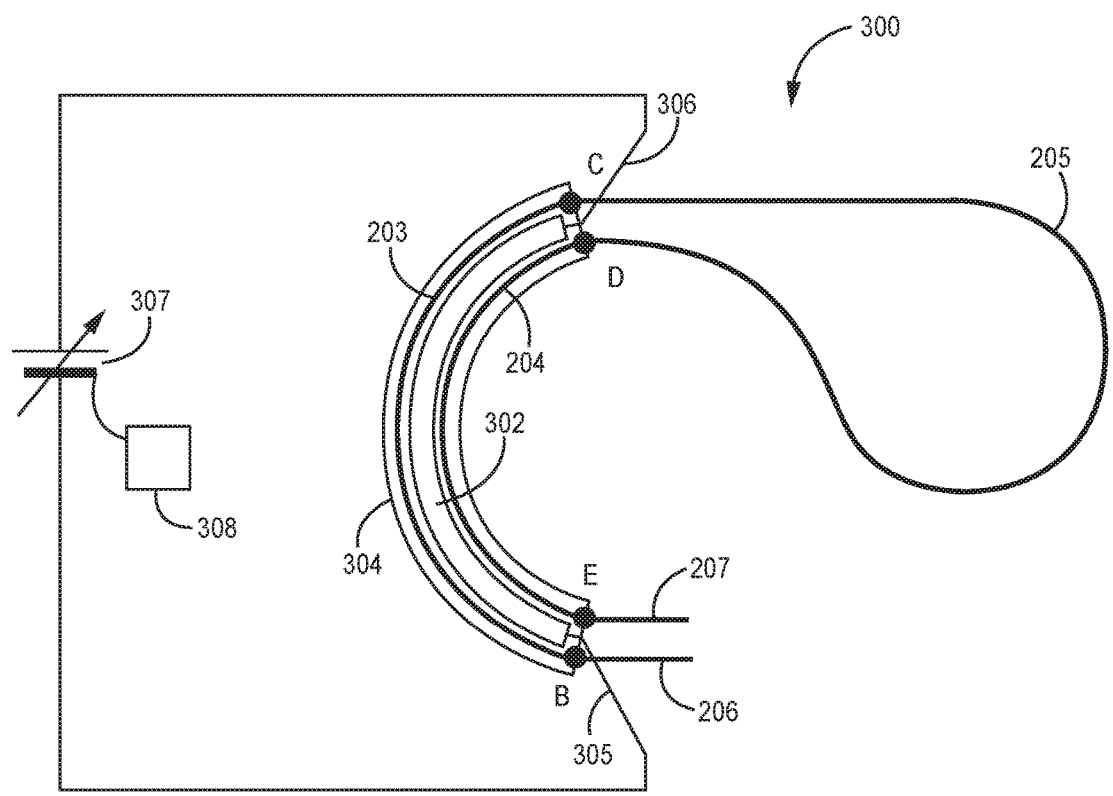
FIG. 20 is a schematic top view of a thermo-optic phase shifter having curved adjacent heated waveguide segments such as shown in FIG. 10, in which the heater is connected to an electrical circuit with a power supply to power the heater.
Figure 21:
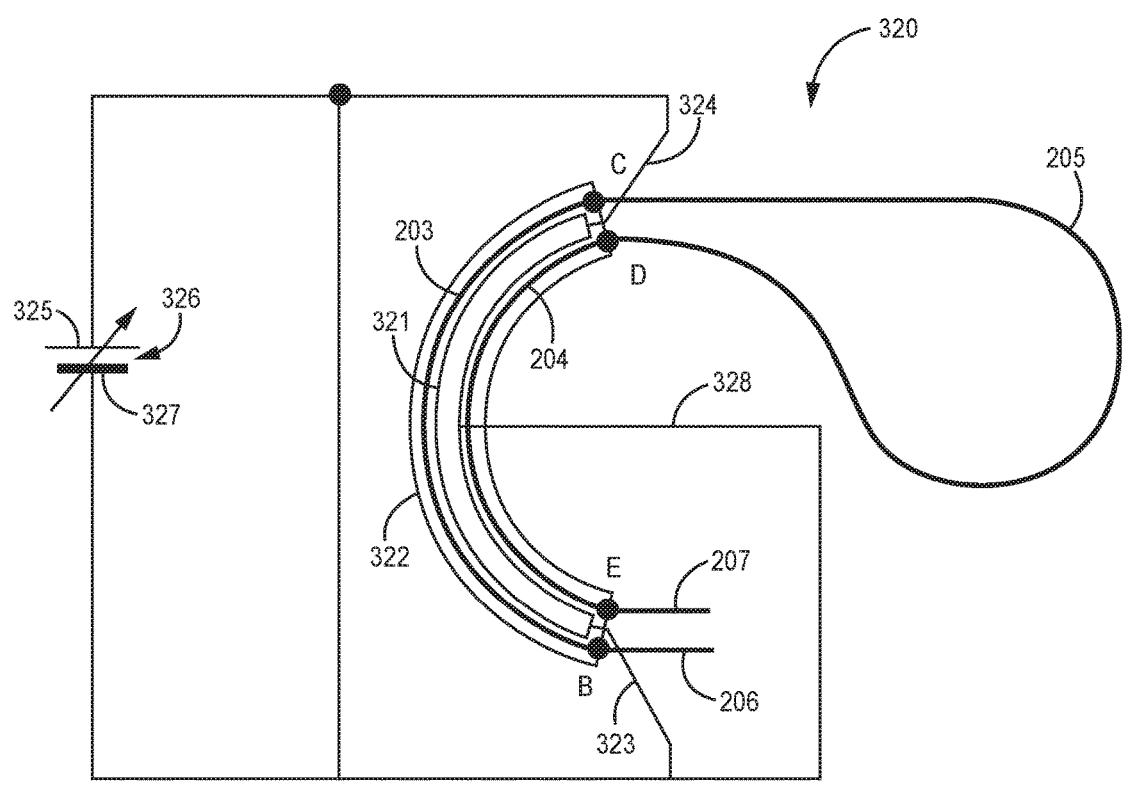
FIG. 21 is a schematic top view of a thermo-optic phase shifter having curved adjacent heated waveguide segments such as shown in FIG. 10 with an alternative configuration of electrical connections to an electrical circuit with a power supply.

FIG. 20 is a schematic top view of a thermo-optic phase shifter 300 with a configuration of electrical interconnects to power a heater 302 with a thermal zone 304 depicted such as may be used for the embodiments in FIGS. 13-16 discussed above. Corresponding electrical connections can also be correspondingly made for thermo-optical phase shifters in FIGS. 1-6. For convenience the optical components are associated with the corresponding optical components of the general thermo-optical phase shifter of FIG. 10, which are also used for FIGS. 13-16. As shown, each end of heater 302 is connected with electrical connections 305, 306 to respective terminals of a voltage source 307. Voltage source 307 is connected to a controller 308, which can be a digital processor or the like, which can be similar connected to the power sources shown in the other figures. Other arrangements of electrical connections are possible. For example, FIG. 21 is a schematic top view of a thermo-optic phase shifter 320 with a configuration of electrical interconnects to power a heater 321 similar to heater 302 of FIG. 20. Heater 321 providing a corresponding thermal zone 322. As shown in FIG. 21, each end of heater 321 is connected respectively with connections 323, 324 to positive side 325 of a voltage source 326 and negative side 327 of voltage source 326 is electrically connected with connection 328 approximately midway between the ends of heater 321.

Figure 22:
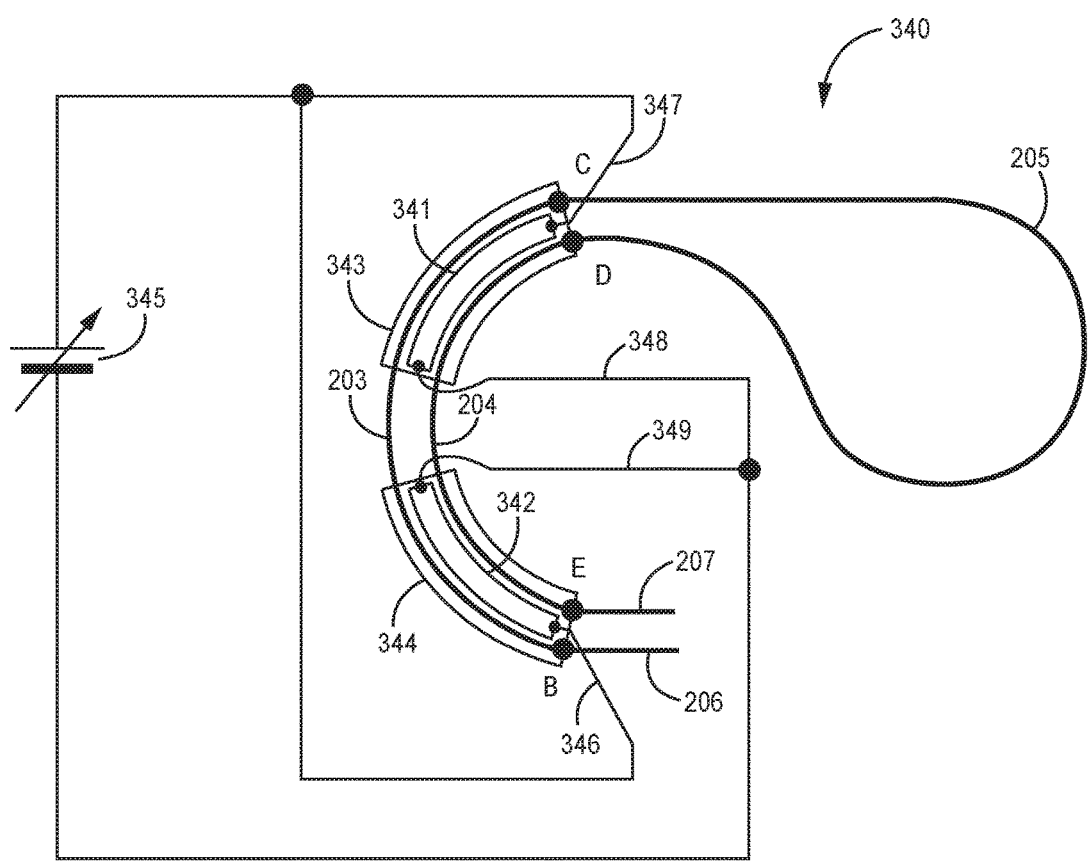
FIG. 22 is a schematic top view of a thermo-optic phase shifter having curved adjacent heated waveguide segments such as shown in FIG. 10 with a heated divided into two sections along the arc of the adjacent curved waveguides in which the two heater sections are connected to an electrical circuit with a power supply.

FIG. 10, as well as FIG. 1 for a straight heated sections of waveguide, depicts most of the corresponding sections of adjoining waveguide sections (from points B to C and points D to E) being heated. In additional or alternative embodiments, the heaters can be segmented along the length of the adjacent waveguide sections. Such an embodiment of the thermo-optic phase shifter is depicted in FIG. 22 depicted again with the optical components, i.e., waveguide, of FIG. 10. FIG. 22 is a schematic top view of a thermo-optic phase shifter 340 with two heater elements 341, 342 separated on the arc of first curved heated optical waveguide section 203 and second curved heated waveguide section 204 and with a configuration of electrical interconnects to power heater elements 341, 342. Heater elements 341, 342 provide corresponding thermal zones 343, 344. This configuration of heater elements divides first curved heated optical waveguide section 203 into a first heated segment, a second heated segment and connecting segment, and similarly second curved heated waveguide section 204 into first heated segment, a second heated segment, and a connecting segment. The first heated segments of first curved heated optical waveguide section 203 and second curved heated optical waveguide segment 204 are within first thermal zone 343, and the second heated segments of first curved heated optical waveguide section 203 and second curved heated optical waveguide section 204 are within second thermal zone 344.

Referring to FIG. 22, outside ends of heater elements 341, 342 are connected to the positive side of a voltage source 345 respectively with connections 346, 347, and inside ends of heater elements 341, 342 are connected to negative side of voltage source 345, respectively, with connections 348, 349. In this configuration, a gap is introduced into the heater at a location midway between the ends. Electrical connection is completed for both heater segments by providing electrical connection from the negative terminal of the voltage source to the heater elements at or near each side of the electrically isolating gap. A wide variety of other divisions of the heater and reasonable arrangements of heater segments will be apparent to those practiced in the art based on the teachings herein.

Figure 23:
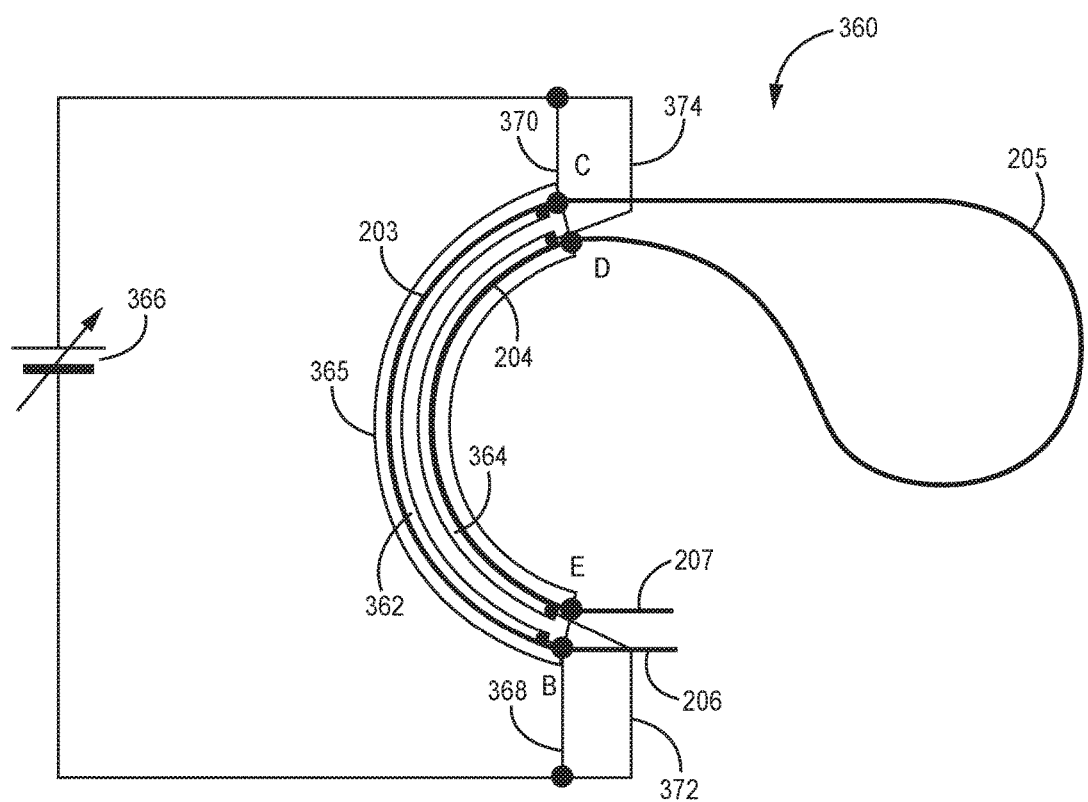
FIG. 23 is a schematic top view of a thermo-optic phase shifter having adjacent curved heated waveguide segments such as shown in FIG. 10 with a heated divided into two segments along the width of the device forming a gap in the heater between the adjacent waveguides in which electrical connections connect the heater to an electrical circuit with a power supply.

FIG. 23 shows a schematic top view of a thermo-optic phase shifter with electrical connections for a two heater element configurations, such as those shown in FIGS. 17-19. Similar electrical connections can be used for the embodiment of the thermo-optic phase shifter in FIGS. 7 and 8. Referring to FIG. 23, thermo-optic phase shifter 360 is again depicted on the optical waveguide platform of FIG. 10 for convenience. The heater for thermo-optic phase shifter 360 has heater elements 362, 364 that provide a thermal zone 365 that covers first curved heated optical waveguide section 203, second curved heated optical waveguide section 204 and heater elements 362, 364. As shown, each heater element 362, 364 is independently connected to a common voltage source 366 through connections 368 and 370 to heater 362 and connections 372, 374 to heater 364. Other arrangements are possible. In one alternative configuration, a separate and independent voltage source could be used for each heater. In a second alternative configuration, the heaters may be electrically connected to each other at each end such that the electrical connections that join the heaters are integrated within the PLC. Heater elements can also be divided along the arc as shown in FIG. 23 with heater elements of FIG. 23 separated for each waveguide, that would correspondingly result in four heater elements with further divisions along the arc possible.

A variable voltage source is depicted in FIGS. 15-18 as the source of electrical power used to drive the heaters; however, those practiced in the art will understand that a variety of other options are possible, including but not limited to a variable current source and a pulse width modulation circuit.

For the embodiments based on curved adjacent waveguides as shown in FIG. 10, there are several distinct curved sections of the waveguide. A first curved region along the plane brings two adjacent segments of curved waveguides adjacent each other for common heating, and a second curved region has the loop in which sections of the waveguide diverge from each other to form the loop. Generally, any curved portion of a waveguide has a limit on the radius of curvature to maintain acceptable levels of optical loss. Thus, for example, the loop section of the waveguide occupies at least a certain area determined by the radius of curvature. The radius of curvature of the loop section can be selected for the optical loss to be no more than about 0.5 dB.

The curved heated adjacent waveguide segments are also constrained to have at least a certain radius of curvature to avoid optical loss, but organization of the device on the plane also suggests that for some applications it is desirable for the radius of curvature of the heated segments to be greater than the radius of curvature of the looped section. If the radius of curvature is appropriately large, the waveguides from the heated section can pass back clear of the loop to leave a central open area that can be used for the placement of additional optical waveguides such as a loop of another thermo-optical phase shifter. The specifics are discussed next in the context of drawings.

Figure 24:
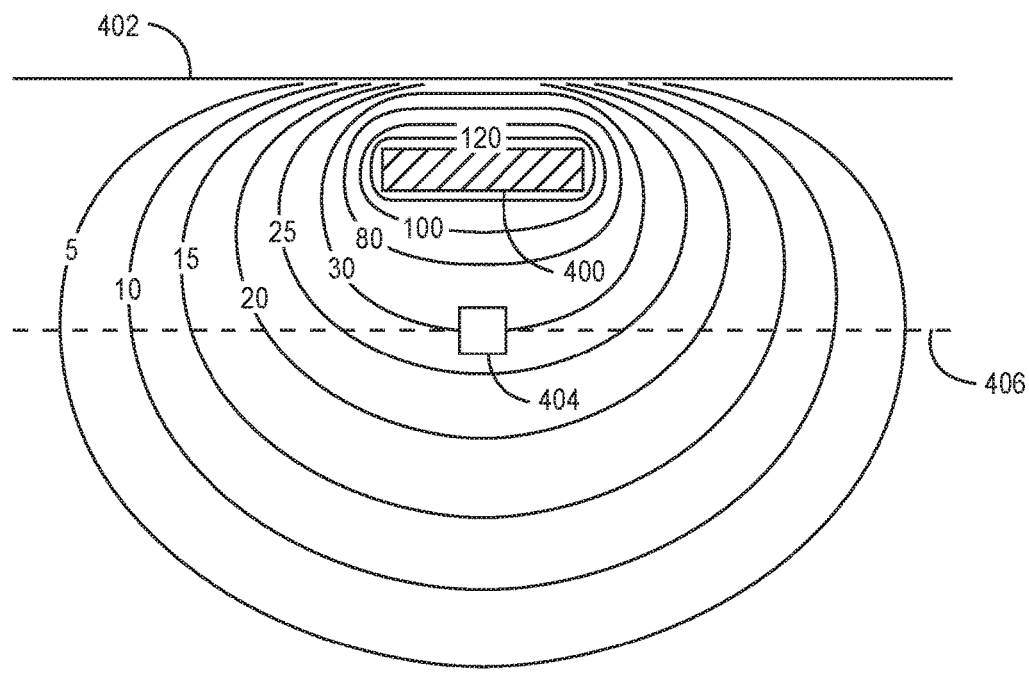
FIG. 24 is a sectional view through a planar lightwave circuit (PLC) showing the placement of a heater below the surface of the PLC and a traditional placement of a waveguide.

To further explain the desirable energy efficiencies of the present phase shifter designs, a schematic cross section is shown in FIG. 24 depicting thermal contours around a heater in a planar lightwave circuit. Referring to FIG. 24, heater 400 is located below surface 402 of the planar lightwave circuit. A waveguide 404 is located in a traditional placement below heater 400. A reference plane 406 for the optical components is shown in FIG. 24 passing through the center of the waveguide. In the schematic depiction of FIG. 24, waveguide 404 is roughly in alignment with a thermal contour corresponding to a 30 degree increase over ambient temperature.

Figure 25:
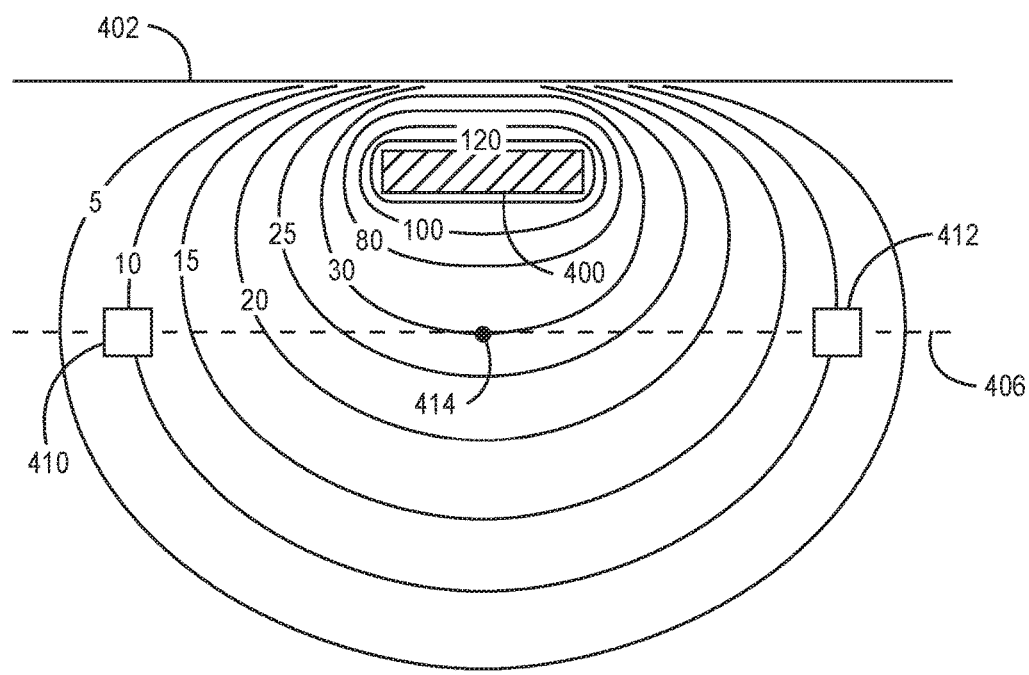
FIG. 25 is a sectional view of a PLC showing two waveguide segments with a heater positioned with its projection in the plane of the waveguides between the two waveguide segments, in which the waveguide separation does not result in energy efficiency.
Figure 26:
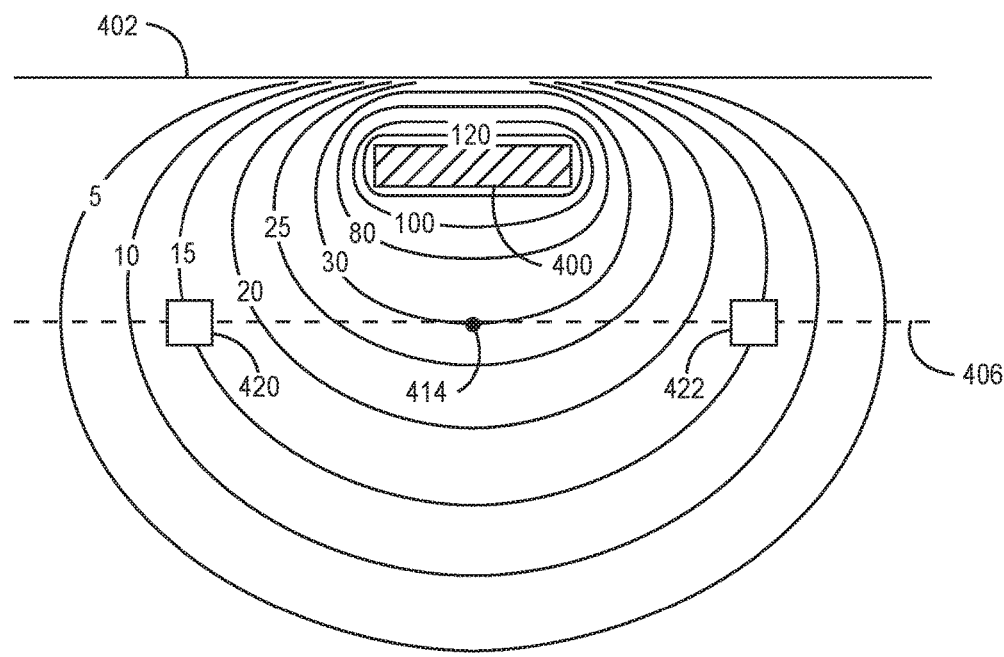
FIG. 26 is a sectional view through a PLC showing an alternative placement of two waveguide segments with the projection of the heater between the waveguide segments in the reference plane, in which the placement of the waveguide segments is such that the energy efficiency would be approximately the same as a traditional phase shifter design.
Figure 27:
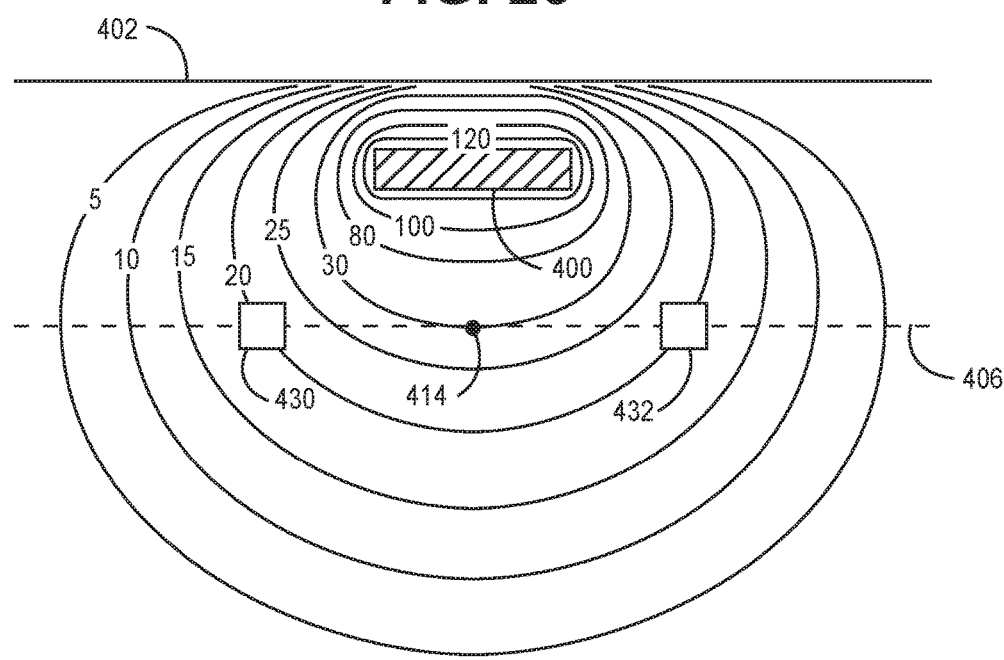
FIG. 27 is a sectional view through a PLC showing a further alternative placement of two waveguide segments with the projection of the heater between the waveguide segments in the reference plane, in which the placement of the waveguide segments is such that the energy efficiency would be improved relative to a traditional phase shifter design.

Referring now to FIG. 25, two waveguide segments 410, 412 are placed with the projection of heater 400 in reference plane 406 between waveguide segments 410, 412. Hot point 414 marks the hottest point along the reference plane due to heat from heater 400. As shown in FIG. 25, waveguide segments 410, 412 are approximately placed on thermal contour corresponding to a 10 degree increase over ambient. The approximate phase shift from the design in FIG. 25 relative to the traditional structure shown in FIG. 24 is about 2×(10/30)=0.67<1, where the factor of two results from the two waveguides and the factor of 10/30 corresponds with the 10 degree increase over ambient versus the 30 degree increase over ambient for the respective configurations. Thus, for the configuration in FIG. 25, the phase shifter is less efficient than the traditional design in FIG. 25. Referring to the alternative configuration in FIG. 26, waveguide segments 420, 422 are place approximately on the thermal contours corresponding to a 15 degree increase over ambient. For this configuration, the approximate phase shift is about 2×(15/30)=1. Thus, for the configuration in FIG. 26, the energy efficiency of the phase shifter is approximately equal to the efficiency of the traditional placement in FIG. 24. Thus, the definition of the thermal zone along the boundary of ½ drop in temperature from hot point 414 indicates where placement of the waveguides within the hot zone results in relative energy efficiency. Referring to FIG. 27, waveguides 430, 432 are placed approximately along the thermal contour corresponding to a 20 degree increase over ambient. For the configuration in FIG. 27, the phase shift is approximately 2×(20/30)=1.33, which corresponds to a significant energy efficiency improvement over the traditional placement in FIG. 24. The theoretical limit of the energy efficiency cannot be reached since the two waveguides cannot be placed arbitrarily close without getting optical interference, but for realistic designs, significant energy efficiencies can be achieved, and energy efficient prototypes are described next.

We fabricated phase shifters with silica glass waveguides with 1.8% index contrast with a traditional design based on a single waveguide segment heated by the heater and with designs roughly corresponding to the design of FIG. 1 with different values of sA. The traditional design typically required 290 mW to achieve a 180 degree phase shift, that is, the efficiency was 0.62 degrees/mW. The energy efficient phase shifter that used a value of sA equal to 20 microns typically required 183 mW to achieve a 180 degree phase shift, that is, the efficiency was 0.98 degrees/mW, which was more efficient than the traditional phase shifter by a factor of 1.58. The energy efficient phase shifter that used a value of sA equal to 12 microns typically required 163 mW to achieve a 180 degree phase shift, that is, the efficiency was 1.12 degrees/mW, which was more efficient than the prior art phase shifter by a factor of 1.81. The theoretical upper limit on the improved efficiency relative to a similar prior art phase shifter is an improvement by a factor of 2.0. The improvement factor (that is, the efficiency divided by the efficiency of a prior art phase shift constructed with similar materials) increases towards 2.0 as sA decreases towards zero. In practical devices, the improvement factor is somewhat less than 2.0 because of the limitation to the allowed proximity of the two heated waveguides (that is, the limit to which sA can be reduced before optical coupling degrades the device performance). The target application of the invention is to achieve an improvement factor between 1.2 and 2.0. For example, for silica waveguides with 1.8% index contrast for which the traditional phase shifter has an efficiency of 0.62 degrees/mW, the target application of the invention is to provide a phase shifter with an efficiency between 0.74 degrees/mW and 1.24 degrees/mW.

Figure 28:
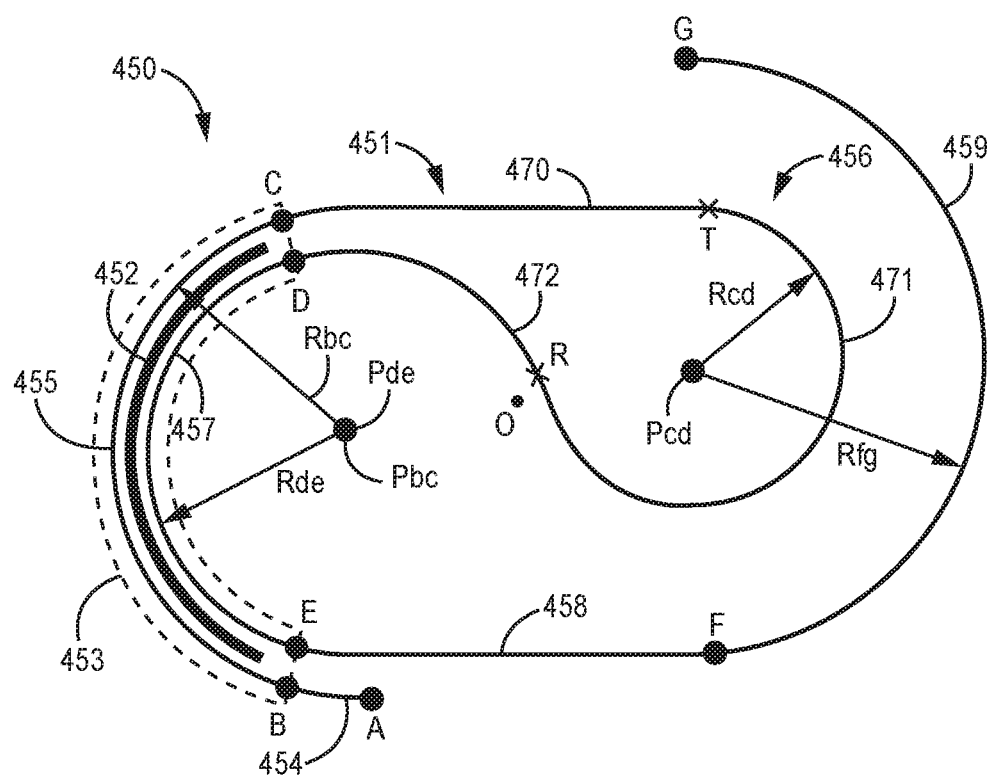
FIG. 28 is a schematic top view of a thermo-optic phase shifter with curved adjacent heated waveguide segments having an optional outer waveguide arc in which various geometrical relationships are noted in the context of explaining compact efficient layout of the energy efficient device.

Referring to FIG. 28, advantageous relative values for some of the geometrical aspects of the thermo-optical phase shifter structure can be emphasized. As illustrated in FIG. 28 and by analogy with the parsing of segments of the phase shifters discussed in the context of FIG. 10, thermo-optic phase shifter 450 comprises optical waveguide 451 and heater 452. As shown in FIG. 28, optical waveguide 451 extends between points A and G. Heater 452 provides a corresponding thermal zone 453 noted with dashed lines. Optical waveguide 451 comprises first waveguide extension 454 (points A-B), outer heated arc 455 (points B-C), loopback section 456 (points C-D), inner heated arc 457 (points D-E), second waveguide extension 458 (points E-F), and optional outer arc 459 (points F-G).

Loopback section 456 comprises extension segment 470, loop portion 471 and reversal segment 472. Extension segment 470 is between points C and T, and reversal segment 472 is between points R and D with loop portion 471 between points I and T. Point R can be considered a point at which the curvature reverses (clockwise to counterclockwise or vice versa) that allows for the different curvatures of loop portion 471 and inner heated arch 457, and point T marks a point at which the radius of curvature becomes greater than the average radius of curvature of inner heated arc 457, which is Rde, as shown in FIG. 28. Loop portion 471 of loopback waveguide 456 is aligned with the arc of a circle of radius Rcd that is centered at point Pcd. In addition, inner heated arc 457 is aligned with the arc of a circle of radius Rde that is centered at point Pde, and outer heated arch 455 is aligned with the arc of a circle of radius Rbc that is also centered at point Pde. The midpoint between Pcd and Pde is illustrated as point O in FIG. 28. In this embodiment, the value of Rcd is smaller than the value of Rde by at least dW and Rbc>Rde by the amount of spacing between the adjacent waveguide sections. The value of dW can be selected to influence the size of the area of the space formed by the arc of inner heated arc 457 and the spacing between optional outer arc 459 and loop portion 471.

Second waveguide extension 458 is between point E and F, and this waveguide section provides for connecting inner heated arc 457 and optional outer arc 459. Optional outer arc 459 and second waveguide extension 458 provide for the rolled configuration allowing for nesting of a second non-interfering thermo-optical phase shifter in roughly the same area, as described below with respect to FIG. 29. While second waveguide extension 458 is shown as straight in the figures, waveguide extension can have some nonlinearities, such as a curvature with a large average radius of curvature to provide for the overall structure. Optional outer arc 459 is depicted as circular with a center Pfg coinciding with Pcd, but these conditions can be relaxed without a significant change in the overall structure. If optional outer arc 459 is not precisely circular and/or if it has a shifter center point, radius Rfg can be considered the average radius and the spacing between the waveguide sections can be correspondingly changed. The placement of point F is not particularly critical with respect to specifying the structure, but F can be specified as the point at which the distance from point Pcd (the average center of radii for waveguides F-G) along the waveguide going away from point E reaches the value of Rfg. The spacing between loop portion 471 and optional outer arc 459 can provide for other waveguides to pass between them without significant optical crosstalk if the value is sufficiently large.

In general, the separation, sA, between adjacent points of the adjacent heated waveguide sections may vary along the length of the thermal zone; however, in some embodiments, sA maintains an approximately constant value along the length of the thermal zone. As described below, if the waveguides approach too closely, optical performance can suffer, and if the waveguides separate too far, thermal efficiencies can be reduced. For example, with curved heated waveguide sections, the first waveguide may be aligned to the arc of a circle with radius Rde and centered at point Pde, while the second waveguide may be aligned to the arc of a circle with radius Rbc and centered at point Pbc in which points Pde and Pbc coincide and Rbc is greater than Rde by a value that is equal to sA. In this example, Rde can be selected to have a value that is large enough to prevent substantial bend loss (that is, the loss associated with light propagating around a bend). For example, for a waveguide that comprises a channel waveguide formed with silica glass with a 1.8% index contrast between core and cladding, a typical application may require that Rde be greater or equal to 1 mm. Values of the various radii of curvature that were determined experimentally for devices comprising silica waveguides with 1.8% index contrast are as follows—suitable radii of curvature for Rfg, Rbc, Rde and Rcd are 1.500 mm, 1.410 mm, 1.390 mm, and 1.300 mm, respectively. Values within 20% of these values (±20%) would also be very effective of devices comprising silica waveguides with a 1.8% index contrast. One skilled in the art would be able to modify these values for any appropriate index contrast. Also, a person of ordinary skill in the art would recognize that additional values and ranges of values within the explicit ranges above, such as the 20% variation range) are contemplated and are within the present disclosure.

While the structure in the previous paragraph may be a particularly desirable design, reasonable performance can be achieved with a relaxation of these conditions, such as having somewhat non-circular waveguide segments. In some embodiments, the spacing sA may not be approximately constant, but can range from the average sA±20% of the average. A person or ordinary skill in the art will recognize that additional ranges within the present ranges are contemplated and are within the present disclosure. If sA is referenced without further comment, sA refers to the average value.

The selection of the value of sA can avoid undesirable optical coupling of the active waveguides if they are situated sufficiently close to each, that is, if sA is undesirably small. Substantial optical coupling can result in undesired optical performance. Herein, sW refers to a selected cut off value (lowest value) for the center to center waveguide separation, sA, above which sufficiently small optical coupling between waveguides provides acceptable optical performance. The selection of the value of sW depends on the details of the waveguide construction, on the details of the values of the index of refraction of the various materials that are used, and on the tolerance of the considered application towards the performance degradation related to optical coupling between optical waveguides, which can be selected to be no more than about −27 dB. Furthermore, one of ordinary skill in the art will be able to select the value of sW, either from experience, experimental measurements and/or by numerical simulations, applicable for their intended application and for the optical waveguides for the particular application.

Consequently, in some embodiments, the value of sA can be selected to be approximately the smallest value consistent with selected restrictions associated within fabrication limits and with spatial selected cutoff spacing on acceptable optical coupling. As known in the art, efficient optical coupling between adjacent waveguides requires modes of the respective waveguides to remain in phase with each other as they propagate; i.e., efficient coupling involves the phase matching condition to be satisfied. Adjacent curved waveguides with equal widths do not satisfy the phase matching condition, hence, the curved heated waveguide section, for example depicted in FIG. 10, exhibit less efficient optical coupling between adjacent waveguide sections than straight waveguide sections for the same value of sA, which is a desirable feature of the curved waveguides. Consequently, the waveguide configuration with curved waveguides allows for a smaller value of sA and consequently allows for improved phase shifting energy efficiency relative to the embodiment depicted in FIG. 1. Our experimental measurements on the thermo-optic phase shifter similar to FIG. 10 having channel waveguides with a 1.8% index contrast relative to the cladding material indicates that curved waveguides may be situated such that sA has a value of 12 microns without substantial performance degradation associated with optical coupling. Our experimental measurements with similar devices demonstrate that substantial heater efficiency improvement when sA had values of 12 microns, 17 microns, and 20 microns. Desirable results are expected are expected for a range of sA values that extend beyond the experimentally verified values. Consequently, desirable results are expected to be obtained with waveguide with 1.8% index contrast has sA with the range from 10 microns to 30 microns. Experimental measurements are described further below. Furthermore, the curved optical waveguide sections of the inventive thermo-optic phase shifter reduce the footprint of the device allowing for more compact implementations.

Figure 29:
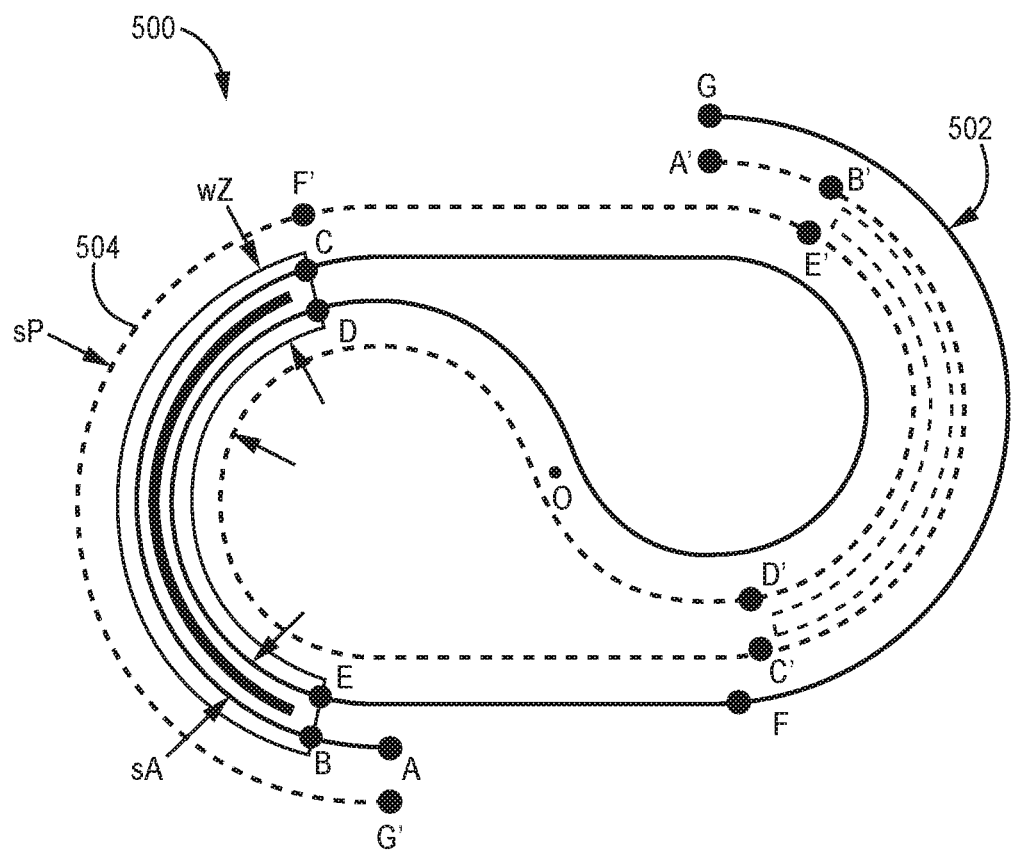
FIG. 29 is a schematic top view of the thermo-optic phase shifter of FIG. 24 with a second uncoupled thermo-optic phase shifter nested within and around the thermo-optic phase shifter of FIG. 24 to provide for the placement of two phase shifter in an area only somewhat larger than the initial phase shifter.

FIG. 29 depicts two nested and uncoupled thermo-optic phase shifters that can essentially be packed into a space just slightly larger than the space occupied by a single thermo-optic phase shifter. PLC 500 comprises first thermo-optic phase shifter 502 and second thermo-optic phase shifter 504. First thermo-optic phase shifter 502 is shown in the format of thermo-optic phase shifter 450 of FIG. 28, and second thermo-optic phase shifter 504 is shown in dashed lines in FIG. 29 in a nested orientation relative to first thermo-optic phase shifter 502. To form this intertwined configuration, the radius of curvature of the inner heated waveguide section should be large enough relative to the loop section that the open area provides for the placement of the portions of a second phase shifter without interference due to heating or optical coupling between the two phase shifters. Generally, for the silica waveguide having a 1.8% index difference discussed herein, this distance between non-interfering waveguides would be generally at least about 50 microns, or corresponding value for alternative waveguide designs.

Corresponding points for A, B, C, D, E, F, and G are labeled for second thermo-optic phase shifter 504 as A', B', C', D', E', F', and G'. Second thermo-optic phase shifter 504 can be roughly a form of first thermo-optic phase shifter 502 rotated 180 degrees around point O. While the efficient packing of two thermo-optic phase shifters may be desirable for various optical devices, this configuration can be particularly convenient for two arms of a Mach-Zehnder interferometer (MZI). Such embodiments of an MZI are described further in U.S. patent application Ser. No. 15/846,413 to McGreer et al., filed on even date with the present patent application, entitled "Compact Energy Efficient Mach-Zehnder Interferometers and Optical Attenuators," incorporated herein by reference. This efficient packing of the thermo-optic phase shifter can be desirably used to shrink optical device sizes that can translate into smaller optical chips or packages or alternatively or additionally into inclusion of additional functionality onto a package.

The materials for forming the PLC can be deposited on a substrate using CVD, variations thereof, flame hydrolysis or other appropriate deposition approach. Suitable substrates include, for example, materials with appropriate tolerance of higher processing temperatures, such as silicon, ceramics, such as silica or alumina, or the like. In some embodiments, suitable silicon dioxide precursors can be introduced, and a silica glass can be doped to provide a desired index of refraction and processing properties. Similar, deposition and doping can be performed for other optical materials. The patterning can be performed with photolithography or other suitable patterning technique. For example, the formation of a silica glass doped with Ge, P and B based on plasma enhanced CVD (PECVD) for use as a top cladding layer for a PLC is described in U.S. Pat. No. 7,160,746 to Zhong et al., entitled "GEBPSG Top Clad for a Planar Lightwave Circuit," incorporated herein by reference. Similarly, the formation of a core for the optical planar waveguides is described, for example, in U.S. Pat. No. 6,615,615 to Zhong et al., entitled "GEPSG Core for a Planar Lightwave Circuit," incorporated herein by reference.

The PLC can be configured with optical connectors at or near edges of the structure to provide for coupling to an optical fiber or other external light channel or waveguide. Thus, the PLC can be integrated with other optical structures of an optical telecommunications network as desired. The PLC with the thermo-optical phase shifter can be packaged appropriately for handling. The PLC can provide for reduced energy consumption for optical network facilities.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. A planar thermo-optic phase shifter comprising a heater and a waveguide on a planar substrate surface establishing the plane of the device, the waveguide comprising two adjacent heated segments having outer edges furthest away from the adjacent heated segment and a loop section connecting the two adjacent heated segments and the heater being positioned over cladding optical material, wherein a projection of the heater into the plane of the waveguides forms a shape that is located between the adjacent heated segments and extends no further than the outer edges of the adjacent heated segments, wherein adjacent heated waveguide segments do not have any waveguide segments between them.

2. The planar thermo-optic phase shifter of claim 1 wherein the waveguide comprises silica glass.

3. The planar thermo-optic phase shifter of claim 1 wherein the adjacent heated segments are curved over at least a portion of the segments.

4. The planar thermo-optic phase shifter of claim 1 wherein the adjacent heated segments are curved over the entire sections.

5. The planar thermo-optic phase shifter of claim 1 wherein the projection of the heater has two separated portions with one portion associated with one waveguide and the other portion being associated with the other waveguide with a gap between the separated heater portions located in the plane of the device between the adjacent heated sections.

6. The planar thermo-optic phase shifter of claim 1 wherein projection of the heater is confined in the plane of the waveguides to be completely between the area connecting the centers of the adjacent heated sections.

7. The planar thermo-optic phase shifter of claim 1 wherein the two adjacent heated sections are within a thermal zone surrounding the heater with boundaries of the thermal zone having a temperature increase of 50% of the temperature increase at the hot point relative to ambient temperature, where the hot point is a location on the plane of the waveguides with the highest temperature.

8. The planar thermo-optic waveguide of claim 1 wherein the loop section has an average radius of curvature selected to result in an optical loss of no more than about 0.5 dB.

9. The planar thermo-optic phase shifter of claim 1 wherein loop section has an average radius of curvature and wherein the adjacent segments are curved with an average radius of curvature greater than the average radius of curvature of the loop section.

10. The planar optical phase shifter of claim 9 wherein optical coupling between the adjacent segments is no more than about −27 dB.

11. The planar optical phase shifter of claim 1 wherein the power consumption of the heater is reduced so that the thermal efficiency has an improvement factor between 1.2 and 2.0 relative to a corresponding phase shifter formed from equivalent materials and heater format with a single waveguide segment within the thermal zone of the heater.

12. A planar thermo-optic phase shifter comprising a heater and a waveguide on a planar substrate surface establishing the plane of the device, the waveguide comprising two adjacent heated core sections connected by a waveguide core loop such that the optical path is opposite in the adjacent heated core sections, wherein considering a reference plane passing through the center of the waveguides and parallel to the plane of the device, a majority of the heated core sections are curved and a projection of the heater in the reference plane is curved along its length and wherein no other sections of the waveguide are heated.

13. The planar thermo-optic phase shifter of claim 12 wherein a projection of the heater in the reference plane is located between the adjacent heated segments and extending no further than the outer edges of the adjacent heated segments.

14. The planar thermo-optic phase shifter of claim 12 wherein the waveguide comprises silica glass.

15. The planar thermo-optic phase shifter of claim 12 wherein the loop section has an average radius of curvature, wherein the adjacent heated core section each have an average radius of curvature greater than the average radius of curvature of the loop section, and wherein an open area is formed between the heated core sections and the loop section.

16. The planar thermo-optic phase shifter of claim 15 wherein a second loop section belonging to a second phase shifter is located within the open area.

17. The planar thermo-optic phase shifter of claim 15 wherein the adjacent heated core sections are curved along substantially their whole length.

18. A method for making an energy efficient thermo-optic phase shifter within a planar lightwave circuit, the method comprising:

depositing metal for a resistive heating element onto a planar optical structure comprising an optical waveguide having two adjacent heated sections separated from each other by an average spacing and optically connected to each other by a loop section of the waveguide, wherein a projection of the metal for the restive heating element in the plane of the waveguides is located at least in part between the adjacent heated sections and optionally extending over one or both heated sections with the projection of the metal in the plane of the waveguides extending no further than outer edges of the adjacent heated section of the waveguide wherein the outer edges of the heated sections are evaluated along a width that is perpendicular to a light propagation direction through the heated sections, wherein adjacent heated waveguide segments do not have any waveguide segments between them.

19. The method of claim 18 wherein the metal is deposited using physical vapor deposition and is patterned using photolithography or deposition through a mask.

20. The method of claim 18 further comprising connecting the heating element to an electrical circuit having a voltage source to provide selective electrical current to the heater to achieve a desired optical phase shift.

21. The method of claim 18 wherein the two adjacent heated sections are curved over the entire sections.

22. The method of claim 18 wherein the two adjacent heated sections are within a thermal zone in a reference plane passing through the centers of the waveguides in a plane parallel to the plane of the device with boundaries of the thermal zone having a temperature increase of 50% of the highest temperature increase within the thermal zone relative to ambient temperature.

* * * * *